(12) United States Patent
McAlister et al.

(10) Patent No.: US 8,905,011 B2
(45) Date of Patent: *Dec. 9, 2014

(54) METHODS AND SYSTEMS FOR ADAPTIVELY COOLING COMBUSTION CHAMBERS IN ENGINES

(71) Applicant: McAlister Technologies, LLC, Phoenix, AZ (US)

(72) Inventors: Roy Edward McAlister, Phoenix, AZ (US); Melvin James Larsen, Phoenix, AZ (US)

(73) Assignee: McAlister Technologies, LLC, Phoenix, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/664,372

(22) Filed: Oct. 30, 2012

(65) Prior Publication Data
US 2013/0263798 A1 Oct. 10, 2013

Related U.S. Application Data

(63) Continuation of application No. 13/027,170, filed on Feb. 14, 2011, now Pat. No. 8,297,265, which is a
(Continued)

(51) Int. Cl.
*F01P 1/04* (2006.01)
*F02D 35/02* (2006.01)
(Continued)

(52) U.S. Cl.
CPC ............. *F01P 7/14* (2013.01); *F05D 2260/232* (2013.01); *F02D 35/023* (2013.01); *F02M 25/00* (2013.01); *F02D 35/026* (2013.01); *F02B 23/101* (2013.01); *F02B 41/04* (2013.01); *F02C 9/40* (2013.01); *F02D 41/0025* (2013.01); *Y02T 10/125* (2013.01); *F02C 6/12* (2013.01); *F02D 35/025* (2013.01); *F02D 35/022* (2013.01); *F02C 7/16* (2013.01)
USPC ....................................... 123/578; 123/41.34

(58) Field of Classification Search
USPC ................. 123/578, 575, 299, 300, 304, 297, 123/41.34, 41.35, 41.42, 25 C, 25 K, 25 J, 123/25 Q
See application file for complete search history.

(56) References Cited

U.S. PATENT DOCUMENTS

| 1,451,384 A | 4/1923 | Whyte |
| 1,765,237 A | 6/1930 | King |

(Continued)

FOREIGN PATENT DOCUMENTS

| DE | 3443022 A1 | 5/1986 |
| DE | 102005060139 A1 | 6/2007 |

(Continued)

OTHER PUBLICATIONS

"Ford DIS/EDIS "Waste Spark" Ignition System." Accessed: Jul. 15, 2010. Printed: Jun. 8, 2011. <http://rockledge.home.comcast.net/~rockledge/RangerPictureGallery/DIS_EDIS.htm>. pp. 1-4.

(Continued)

*Primary Examiner* — Mahmoud Gimie
(74) *Attorney, Agent, or Firm* — Perkins Coie LLP

(57) ABSTRACT

The present disclosure is directed to various embodiments of systems and methods for cooling a combustion chamber of an engine. One method includes introducing fuel into the combustion chamber of an engine having an energy transfer device that moves through an intake stroke, a compression stroke, a power stroke, and an exhaust stroke. The method further includes monitoring a temperature of the combustion chamber. When the temperature reaches a predetermined value, the method also includes introducing coolant into the combustion chamber only during at least one of the power stroke and the exhaust stroke of the energy transfer device.

14 Claims, 10 Drawing Sheets

Related U.S. Application Data continuation-in-part of application No. 12/961,461, filed on Dec. 6, 2010, now abandoned.

(60) Provisional application No. 61/304,403, filed on Feb. 13, 2010.

(51) Int. Cl.
*F02M 25/00* (2006.01)
*F02B 23/10* (2006.01)
*F02C 9/40* (2006.01)
*F01P 7/14* (2006.01)
*F02D 41/00* (2006.01)
*F02C 6/12* (2006.01)
*F02C 7/16* (2006.01)
*F02B 41/04* (2006.01)

(56) References Cited

U.S. PATENT DOCUMENTS

| | | |
|---|---|---|
| 2,068,038 A | 1/1937 | Prothero et al. |
| 2,255,203 A | 9/1941 | Wiegand |
| 2,441,277 A | 5/1948 | Lamphere |
| 2,721,100 A | 10/1955 | Bodine, Jr. |
| 3,058,453 A | 10/1962 | May |
| 3,060,912 A | 10/1962 | May |
| 3,081,758 A | 3/1963 | May |
| 3,243,335 A | 3/1966 | Faile |
| 3,286,164 A | 11/1966 | De Huff |
| 3,373,724 A | 3/1968 | Papst |
| 3,391,680 A | 7/1968 | Benson |
| 3,520,961 A | 7/1970 | Suda et al. |
| 3,594,877 A | 7/1971 | Suda et al. |
| 3,608,050 A | 9/1971 | Carman et al. |
| 3,689,293 A | 9/1972 | Beall |
| 3,745,887 A | 7/1973 | Striegl |
| 3,789,807 A | 2/1974 | Pinkerton |
| 3,926,169 A | 12/1975 | Leshner et al. |
| 3,931,438 A | 1/1976 | Beall et al. |
| 3,958,540 A | 5/1976 | Siewert |
| 3,960,995 A | 6/1976 | Kourkene |
| 3,976,039 A | 8/1976 | Henault |
| 3,980,056 A | 9/1976 | Kraus |
| 3,997,352 A | 12/1976 | Beall |
| 4,020,803 A | 5/1977 | Thuren et al. |
| 4,041,910 A | 8/1977 | Houseman |
| 4,062,338 A | 12/1977 | Toth |
| 4,066,046 A | 1/1978 | McAlister |
| 4,095,580 A | 6/1978 | Murray et al. |
| 4,105,004 A | 8/1978 | Asai et al. |
| 4,116,389 A | 9/1978 | Furtah et al. |
| 4,122,816 A | 10/1978 | Fitzgerald et al. |
| 4,135,481 A | 1/1979 | Resler, Jr. |
| 4,172,921 A | 10/1979 | Kiefer |
| 4,183,467 A | 1/1980 | Sheraton et al. |
| 4,203,393 A | 5/1980 | Giardini |
| 4,281,797 A | 8/1981 | Kimata et al. |
| 4,288,981 A | 9/1981 | Wright |
| 4,293,188 A | 10/1981 | McMahon |
| 4,303,045 A | 12/1981 | Austin, Jr. |
| 4,330,732 A | 5/1982 | Lowther |
| 4,332,223 A | 6/1982 | Dalton |
| 4,364,342 A | 12/1982 | Asik |
| 4,364,363 A | 12/1982 | Miyagi et al. |
| 4,368,707 A | 1/1983 | Leshner et al. |
| 4,377,455 A | 3/1983 | Kadija et al. |
| 4,381,740 A | 5/1983 | Crocker |
| 4,382,189 A | 5/1983 | Wilson |
| 4,391,914 A | 7/1983 | Beall |
| 4,413,474 A | 11/1983 | Moscrip |
| 4,432,310 A | 2/1984 | Waller |
| 4,448,160 A | 5/1984 | Vosper |
| 4,469,160 A | 9/1984 | Giamei |
| 4,483,485 A | 11/1984 | Kamiya et al. |
| 4,511,612 A | 4/1985 | Huther et al. |
| 4,528,270 A | 7/1985 | Matsunaga |
| 4,536,452 A | 8/1985 | Stempin et al. |
| 4,553,508 A | 11/1985 | Stinebaugh |
| 4,567,857 A | 2/1986 | Houseman et al. |
| 4,574,037 A | 3/1986 | Samejima et al. |
| 4,677,960 A | 7/1987 | Ward |
| 4,684,211 A | 8/1987 | Weber et al. |
| 4,688,538 A | 8/1987 | Ward et al. |
| 4,700,891 A | 10/1987 | Hans et al. |
| 4,716,874 A | 1/1988 | Hilliard et al. |
| 4,733,646 A | 3/1988 | Iwasaki |
| 4,736,718 A | 4/1988 | Linder |
| 4,742,265 A | 5/1988 | Giachino et al. |
| 4,760,818 A | 8/1988 | Brooks et al. |
| 4,760,820 A | 8/1988 | Tozzi |
| 4,774,914 A | 10/1988 | Ward |
| 4,774,919 A | 10/1988 | Matsuo et al. |
| 4,777,925 A | 10/1988 | LaSota |
| 4,834,033 A | 5/1989 | Larsen |
| 4,841,925 A | 6/1989 | Ward |
| 4,884,533 A | 12/1989 | Risitano et al. |
| 4,922,883 A | 5/1990 | Iwasaki |
| 4,932,263 A | 6/1990 | Wlodarczyk |
| 4,967,708 A | 11/1990 | Linder et al. |
| 4,977,873 A | 12/1990 | Cherry et al. |
| 4,979,406 A | 12/1990 | Waller |
| 4,982,708 A | 1/1991 | Stutzenberger |
| 5,034,852 A | 7/1991 | Rosenberg |
| 5,035,360 A | 7/1991 | Green et al. |
| 5,036,669 A | 8/1991 | Earleson et al. |
| 5,055,435 A | 10/1991 | Hamanaka et al. |
| 5,056,496 A | 10/1991 | Morino et al. |
| 5,069,189 A | 12/1991 | Saito |
| 5,072,617 A | 12/1991 | Weiss |
| 5,076,223 A | 12/1991 | Harden et al. |
| 5,095,742 A | 3/1992 | James et al. |
| 5,107,673 A | 4/1992 | Sato et al. |
| 5,109,817 A | 5/1992 | Cherry |
| 5,125,366 A | 6/1992 | Hobbs |
| 5,131,376 A | 7/1992 | Ward et al. |
| 5,150,682 A | 9/1992 | Magnet |
| 5,178,119 A | 1/1993 | Gale |
| 5,193,515 A | 3/1993 | Oota et al. |
| 5,207,208 A | 5/1993 | Ward |
| 5,211,142 A | 5/1993 | Matthews et al. |
| 5,220,901 A | 6/1993 | Morita et al. |
| 5,222,481 A | 6/1993 | Morikawa |
| 5,267,601 A | 12/1993 | Dwivedi |
| 5,297,518 A | 3/1994 | Cherry |
| 5,305,360 A | 4/1994 | Remark et al. |
| 5,328,094 A | 7/1994 | Goetzke et al. |
| 5,329,606 A | 7/1994 | Andreassen |
| 5,343,699 A | 9/1994 | McAlister |
| 5,345,906 A | 9/1994 | Luczak |
| 5,377,633 A | 1/1995 | Wakeman |
| 5,390,546 A | 2/1995 | Wlodarczyk |
| 5,392,745 A | 2/1995 | Beck |
| 5,394,838 A * | 3/1995 | Chandler ............ 123/25 C |
| 5,394,852 A | 3/1995 | McAlister |
| 5,421,195 A | 6/1995 | Wlodarczyk |
| 5,421,299 A | 6/1995 | Cherry |
| 5,435,286 A | 7/1995 | Carroll, III et al. |
| 5,439,532 A | 8/1995 | Fraas |
| 5,456,241 A | 10/1995 | Ward |
| 5,475,772 A | 12/1995 | Hung et al. |
| 5,497,744 A | 3/1996 | Nagaosa et al. |
| 5,517,961 A | 5/1996 | Ward |
| 5,531,199 A | 7/1996 | Bryant et al. |
| 5,549,746 A | 8/1996 | Scott et al. |
| 5,568,801 A | 10/1996 | Paterson et al. |
| 5,584,490 A | 12/1996 | Inoue et al. |
| 5,588,299 A | 12/1996 | DeFreitas |
| 5,605,125 A | 2/1997 | Yaoita |
| 5,607,106 A | 3/1997 | Bentz et al. |
| 5,608,832 A | 3/1997 | Pfandl et al. |
| 5,647,309 A | 7/1997 | Avery |
| 5,662,389 A | 9/1997 | Truglio et al. |
| 5,676,026 A | 10/1997 | Tsuboi et al. |
| 5,694,761 A | 12/1997 | Griffin, Jr. |

(56) References Cited

U.S. PATENT DOCUMENTS

| | | |
|---|---|---|
| 5,699,253 A | 12/1997 | Puskorius et al. |
| 5,702,761 A | 12/1997 | DiChiara, Jr. et al. |
| 5,704,321 A | 1/1998 | Suckewer et al. |
| 5,704,553 A | 1/1998 | Wieczorek et al. |
| 5,714,680 A | 2/1998 | Taylor et al. |
| 5,715,788 A | 2/1998 | Tarr et al. |
| 5,733,105 A | 3/1998 | Beckett et al. |
| 5,738,818 A | 4/1998 | Atmur et al. |
| 5,745,615 A | 4/1998 | Atkins et al. |
| 5,746,171 A | 5/1998 | Yaoita |
| 5,767,026 A | 6/1998 | Kondoh et al. |
| 5,797,427 A | 8/1998 | Buescher |
| 5,806,581 A | 9/1998 | Haasch et al. |
| 5,816,217 A | 10/1998 | Wong |
| 5,853,175 A | 12/1998 | Udagawa |
| 5,863,326 A | 1/1999 | Nause et al. |
| 5,876,659 A | 3/1999 | Yasutomi et al. |
| 5,915,272 A | 6/1999 | Foley et al. |
| 5,930,420 A | 7/1999 | Atkins et al. |
| 5,941,207 A | 8/1999 | Anderson et al. |
| 5,947,091 A | 9/1999 | Krohn et al. |
| 5,975,032 A | 11/1999 | Iwata |
| 5,983,855 A | 11/1999 | Benedikt et al. |
| 6,000,628 A | 12/1999 | Lorraine |
| 6,015,065 A | 1/2000 | McAlister |
| 6,017,390 A | 1/2000 | Charych et al. |
| 6,021,573 A | 2/2000 | Kikuchi et al. |
| 6,026,568 A | 2/2000 | Atmur et al. |
| 6,029,627 A | 2/2000 | VanDyne |
| 6,042,028 A | 3/2000 | Xu |
| 6,062,498 A | 5/2000 | Klopfer |
| 6,081,183 A | 6/2000 | Mading et al. |
| 6,085,990 A | 7/2000 | Augustin |
| 6,092,501 A | 7/2000 | Matayoshi et al. |
| 6,092,507 A | 7/2000 | Bauer et al. |
| 6,093,338 A | 7/2000 | Tani et al. |
| 6,102,303 A | 8/2000 | Bright et al. |
| 6,131,607 A | 10/2000 | Cooke |
| 6,138,639 A | 10/2000 | Hiraya et al. |
| 6,155,212 A | 12/2000 | McAlister |
| 6,157,011 A | 12/2000 | Lai |
| 6,173,913 B1 | 1/2001 | Shafer et al. |
| 6,176,075 B1 | 1/2001 | Griffin, Jr. |
| 6,185,355 B1 | 2/2001 | Hung |
| 6,189,522 B1 | 2/2001 | Moriya |
| 6,253,728 B1 | 7/2001 | Matayoshi et al. |
| 6,267,307 B1 | 7/2001 | Pontoppidan |
| 6,281,976 B1 | 8/2001 | Taylor et al. |
| 6,318,306 B1 | 11/2001 | Komatsu |
| 6,335,065 B1 | 1/2002 | Steinlage et al. |
| 6,338,445 B1 | 1/2002 | Lambert et al. |
| 6,340,015 B1 | 1/2002 | Benedikt et al. |
| 6,360,721 B1 | 3/2002 | Schuricht et al. |
| 6,378,485 B2 | 4/2002 | Elliott |
| 6,386,178 B1 | 5/2002 | Rauch |
| 6,436,196 B1 | 8/2002 | Buchanan et al. |
| 6,446,597 B1 | 9/2002 | McAlister |
| 6,453,660 B1 | 9/2002 | Johnson et al. |
| 6,455,173 B1 | 9/2002 | Marijnissen et al. |
| 6,455,451 B1 | 9/2002 | Brodkin et al. |
| 6,478,007 B2 | 11/2002 | Miyashita et al. |
| 6,483,311 B1 | 11/2002 | Ketterer et al. |
| 6,487,858 B2 | 12/2002 | Cammack |
| 6,490,391 B1 | 12/2002 | Zhao et al. |
| 6,501,875 B2 | 12/2002 | Zhao et al. |
| 6,503,584 B1 | 1/2003 | McAlister |
| 6,506,336 B1 | 1/2003 | Beall et al. |
| 6,516,114 B2 | 2/2003 | Zhao et al. |
| 6,517,011 B1 | 2/2003 | Ayanji et al. |
| 6,517,623 B1 | 2/2003 | Brodkin et al. |
| 6,532,315 B1 | 3/2003 | Hung et al. |
| 6,536,405 B1 | 3/2003 | Rieger et al. |
| 6,542,663 B1 | 4/2003 | Zhao et al. |
| 6,543,700 B2 | 4/2003 | Jameson et al. |
| 6,549,713 B1 | 4/2003 | Pi et al. |
| 6,550,458 B2 | 4/2003 | Yamakado et al. |
| 6,556,746 B1 | 4/2003 | Zhao et al. |
| 6,561,168 B2 | 5/2003 | Hokao et al. |
| 6,567,599 B2 | 5/2003 | Hung |
| 6,571,035 B1 | 5/2003 | Pi et al. |
| 6,578,775 B2 | 6/2003 | Hokao |
| 6,583,901 B1 | 6/2003 | Hung |
| 6,584,244 B2 | 6/2003 | Hung |
| 6,585,171 B1 | 7/2003 | Boecking |
| 6,587,239 B1 | 7/2003 | Hung |
| 6,599,028 B1 | 7/2003 | Shu et al. |
| 6,615,810 B2 | 9/2003 | Funk et al. |
| 6,615,899 B1 | 9/2003 | Woodward et al. |
| 6,619,269 B1 | 9/2003 | Stier et al. |
| 6,621,964 B2 | 9/2003 | Quinn et al. |
| 6,637,382 B1 | 10/2003 | Brehob et al. |
| 6,647,948 B2 | 11/2003 | Kyuuma et al. |
| 6,663,027 B2 | 12/2003 | Jameson et al. |
| 6,668,630 B1 | 12/2003 | Kuglin et al. |
| 6,672,277 B2 | 1/2004 | Yasuoka et al. |
| 6,700,306 B2 | 3/2004 | Nakamura et al. |
| 6,705,274 B2 | 3/2004 | Kubo |
| 6,719,224 B2 | 4/2004 | Enomoto et al. |
| 6,722,339 B2 | 4/2004 | Elliott |
| 6,722,340 B1 | 4/2004 | Sukegawa et al. |
| 6,722,840 B2 | 4/2004 | Fujisawa et al. |
| 6,725,826 B2 | 4/2004 | Esteghlal |
| 6,742,482 B2 | 6/2004 | Artola |
| 6,745,744 B2 | 6/2004 | Suckewer et al. |
| 6,748,918 B2 | 6/2004 | Rieger et al. |
| 6,749,043 B2 | 6/2004 | Brown et al. |
| 6,755,175 B1 | 6/2004 | McKay et al. |
| 6,756,140 B1 | 6/2004 | McAlister |
| 6,763,811 B1 | 7/2004 | Tamol, Sr. |
| 6,776,352 B2 | 8/2004 | Jameson |
| 6,779,513 B2 | 8/2004 | Pellizzari et al. |
| 6,796,516 B2 | 9/2004 | Maier et al. |
| 6,799,513 B2 | 10/2004 | Schafer |
| 6,802,894 B2 | 10/2004 | Brodkin et al. |
| 6,811,103 B2 | 11/2004 | Gurich et al. |
| 6,814,064 B2 | 11/2004 | Cowans |
| 6,814,313 B2 | 11/2004 | Petrone et al. |
| 6,832,472 B2 | 12/2004 | Huang et al. |
| 6,832,588 B2 | 12/2004 | Herden et al. |
| 6,845,920 B2 | 1/2005 | Sato et al. |
| 6,851,413 B1 | 2/2005 | Tamol, Sr. |
| 6,854,438 B2 | 2/2005 | Hilger et al. |
| 6,871,630 B2 | 3/2005 | Herden et al. |
| 6,883,490 B2 | 4/2005 | Jayne |
| 6,892,971 B2 | 5/2005 | Rieger et al. |
| 6,898,355 B2 | 5/2005 | Johnson et al. |
| 6,899,076 B2 | 5/2005 | Funaki et al. |
| 6,904,893 B2 | 6/2005 | Hotta et al. |
| 6,912,998 B1 | 7/2005 | Rauznitz et al. |
| 6,925,983 B2 | 8/2005 | Herden et al. |
| 6,935,284 B2 | 8/2005 | Qian et al. |
| 6,940,213 B1 | 9/2005 | Heinz et al. |
| 6,954,074 B2 | 10/2005 | Zhu et al. |
| 6,955,154 B1 | 10/2005 | Douglas |
| 6,955,165 B2 | 10/2005 | Liu |
| 6,959,693 B2* | 11/2005 | Oda ............................ 123/431 |
| 6,976,683 B2 | 12/2005 | Eckert et al. |
| 6,978,767 B2 | 12/2005 | Bonutti |
| 6,984,305 B2 | 1/2006 | McAlister |
| 6,993,960 B2 | 2/2006 | Benson |
| 6,994,073 B2 | 2/2006 | Tozzi et al. |
| 7,007,658 B1 | 3/2006 | Cherry et al. |
| 7,007,661 B2 | 3/2006 | Warlick |
| 7,013,863 B2 | 3/2006 | Shiraishi et al. |
| 7,025,358 B2 | 4/2006 | Ueta et al. |
| 7,032,845 B2 | 4/2006 | Dantes et al. |
| 7,070,126 B2 | 7/2006 | Shinogle |
| 7,073,480 B2 | 7/2006 | Shiraishi et al. |
| 7,077,100 B2 | 7/2006 | Vogel et al. |
| 7,077,108 B2 | 7/2006 | Fujita et al. |
| 7,077,379 B1 | 7/2006 | Taylor |
| 7,086,376 B2 | 8/2006 | McKay |
| 7,104,246 B1 | 9/2006 | Gagliano et al. |
| 7,104,250 B1 | 9/2006 | Yi et al. |

(56) References Cited

U.S. PATENT DOCUMENTS

| | | | |
|---|---|---|---|
| 7,121,253 | B2 | 10/2006 | Shiraishi et al. |
| 7,124,718 | B2 | 10/2006 | Artola |
| 7,131,426 | B2 | 11/2006 | Ichinose et al. |
| 7,137,382 | B2 | 11/2006 | Zhu et al. |
| 7,138,046 | B2 | 11/2006 | Roychowdhury |
| 7,140,347 | B2 | 11/2006 | Suzuki et al. |
| 7,140,353 | B1 | 11/2006 | Rauznitz et al. |
| 7,140,562 | B2 | 11/2006 | Holzgrefe et al. |
| 7,198,208 | B2 | 4/2007 | Dye et al. |
| 7,201,136 | B2 | 4/2007 | McKay et al. |
| 7,204,133 | B2 | 4/2007 | Benson et al. |
| 7,214,883 | B2 | 5/2007 | Leyendecker |
| 7,228,840 | B2 | 6/2007 | Sukegawa et al. |
| 7,249,578 | B2 | 7/2007 | Fricke et al. |
| 7,255,290 | B2 | 8/2007 | Bright et al. |
| 7,272,487 | B2 | 9/2007 | Christen et al. |
| 7,278,392 | B2 | 10/2007 | Zillmer et al. |
| 7,305,971 | B2 | 12/2007 | Fujii |
| 7,309,029 | B2 | 12/2007 | Boecking |
| 7,334,558 | B2 | 2/2008 | Higgins |
| 7,340,118 | B2 | 3/2008 | Wlodarczyk et al. |
| 7,357,108 | B2 | 4/2008 | Gracyalny |
| 7,367,319 | B2 | 5/2008 | Kuo et al. |
| 7,386,982 | B2 | 6/2008 | Runkle et al. |
| 7,404,395 | B2 | 7/2008 | Yoshimoto |
| 7,409,929 | B2 | 8/2008 | Miyahara et al. |
| 7,418,940 | B1 | 9/2008 | Yi et al. |
| 7,481,043 | B2 | 1/2009 | Hirata et al. |
| 7,484,369 | B2 | 2/2009 | Myhre |
| 7,513,222 | B2 | 4/2009 | Orlosky |
| 7,527,041 | B2 | 5/2009 | Wing et al. |
| 7,540,271 | B2 | 6/2009 | Stewart et al. |
| 7,554,250 | B2 | 6/2009 | Kadotani et al. |
| 7,574,983 | B2 * | 8/2009 | Kuo ................. 123/25 C |
| 7,588,012 | B2 | 9/2009 | Gibson et al. |
| 7,625,531 | B1 | 12/2009 | Coates et al. |
| 7,626,315 | B2 | 12/2009 | Nagase |
| 7,628,137 | B1 | 12/2009 | McAlister |
| 7,650,873 | B2 | 1/2010 | Hofbauer et al. |
| 7,703,775 | B2 | 4/2010 | Matsushita et al. |
| 7,707,832 | B2 | 5/2010 | Commaret et al. |
| 7,714,483 | B2 | 5/2010 | Hess et al. |
| 7,728,489 | B2 | 6/2010 | Heinz et al. |
| 7,753,659 | B2 | 7/2010 | Boyl-Davis et al. |
| 7,849,833 | B2 | 12/2010 | Toyoda |
| 7,880,193 | B2 | 2/2011 | Lam |
| 7,886,993 | B2 | 2/2011 | Bachmaier et al. |
| 7,898,258 | B2 | 3/2011 | Neuberth et al. |
| 7,918,212 | B2 | 4/2011 | Verdejo et al. |
| 7,938,102 | B2 | 5/2011 | Sherry |
| 7,942,136 | B2 | 5/2011 | Lepsch et al. |
| 8,069,836 | B2 | 12/2011 | Ehresman |
| 8,091,528 | B2 | 1/2012 | McAlister |
| 8,166,926 | B2 | 5/2012 | Sasaki et al. |
| 8,297,254 | B2 | 10/2012 | McAlister |
| 8,297,265 | B2 | 10/2012 | McAlister et al. |
| 8,479,690 | B2 | 7/2013 | Maro |
| 8,505,516 | B2 | 8/2013 | Cheiky |
| 8,555,860 | B2 | 10/2013 | McAlister |
| 2002/0017573 | A1 | 2/2002 | Sturman |
| 2002/0070267 | A1 | 6/2002 | Okamura et al. |
| 2002/0084793 | A1 | 7/2002 | Hung et al. |
| 2002/0131171 | A1 | 9/2002 | Hung |
| 2002/0131666 | A1 | 9/2002 | Hung et al. |
| 2002/0131673 | A1 | 9/2002 | Hung |
| 2002/0131674 | A1 | 9/2002 | Hung |
| 2002/0131686 | A1 | 9/2002 | Hung |
| 2002/0131706 | A1 | 9/2002 | Hung |
| 2002/0131756 | A1 | 9/2002 | Hung |
| 2002/0141692 | A1 | 10/2002 | Hung |
| 2002/0150375 | A1 | 10/2002 | Hung et al. |
| 2002/0151113 | A1 | 10/2002 | Hung et al. |
| 2002/0166536 | A1 | 11/2002 | Hitomi et al. |
| 2003/0012985 | A1 | 1/2003 | McAlister |
| 2003/0127531 | A1 | 7/2003 | Hohl |
| 2004/0008989 | A1 | 1/2004 | Hung |
| 2004/0182359 | A1 | 9/2004 | Stewart et al. |
| 2004/0256495 | A1 | 12/2004 | Baker et al. |
| 2005/0045146 | A1 | 3/2005 | McKay et al. |
| 2005/0045148 | A1 | 3/2005 | Katsuragawa et al. |
| 2005/0081805 | A1 | 4/2005 | Novotny |
| 2005/0098663 | A1 | 5/2005 | Ishii |
| 2005/0224043 | A1 * | 10/2005 | Vogel et al. ................. 123/297 |
| 2005/0255011 | A1 | 11/2005 | Greathouse et al. |
| 2005/0257776 | A1 | 11/2005 | Bonutti |
| 2006/0005738 | A1 | 1/2006 | Kumar |
| 2006/0005739 | A1 | 1/2006 | Kumar |
| 2006/0016916 | A1 | 1/2006 | Petrone et al. |
| 2006/0037563 | A1 | 2/2006 | Raab et al. |
| 2006/0102140 | A1 | 5/2006 | Sukegawa et al. |
| 2006/0108452 | A1 | 5/2006 | Anzinger et al. |
| 2006/0169244 | A1 | 8/2006 | Allen |
| 2007/0034175 | A1 | 2/2007 | Higgins |
| 2007/0142204 | A1 | 6/2007 | Park et al. |
| 2007/0189114 | A1 | 8/2007 | Reiner et al. |
| 2007/0277775 | A1 * | 12/2007 | Orlosky ................. 123/25 C |
| 2007/0283927 | A1 | 12/2007 | Fukumoto et al. |
| 2008/0072871 | A1 | 3/2008 | Vogel et al. |
| 2008/0081120 | A1 | 4/2008 | Van Ooij et al. |
| 2008/0098984 | A1 | 5/2008 | Sakamaki |
| 2008/0103672 | A1 | 5/2008 | Ueda et al. |
| 2008/0289606 | A1 | 11/2008 | Bahnev |
| 2009/0078798 | A1 | 3/2009 | Gruendl et al. |
| 2009/0093951 | A1 | 4/2009 | McKay et al. |
| 2009/0145398 | A1 | 6/2009 | Kemeny |
| 2009/0204306 | A1 | 8/2009 | Goeke et al. |
| 2009/0223480 | A1 | 9/2009 | Sleiman et al. |
| 2009/0264574 | A1 | 10/2009 | Van Ooij et al. |
| 2010/0020518 | A1 | 1/2010 | Bustamante |
| 2010/0043758 | A1 | 2/2010 | Caley |
| 2010/0077986 | A1 * | 4/2010 | Chen ................. 123/25 C |
| 2010/0077987 | A1 | 4/2010 | Voisin |
| 2010/0174470 | A1 | 7/2010 | Bromberg et al. |
| 2010/0206249 | A1 | 8/2010 | Bromberg et al. |
| 2011/0134049 | A1 | 6/2011 | Lin et al. |
| 2011/0259285 | A1 | 10/2011 | Michikawauchi et al. |
| 2011/0259290 | A1 | 10/2011 | Michikawauchi et al. |
| 2011/0265463 | A1 | 11/2011 | Kojima et al. |

FOREIGN PATENT DOCUMENTS

| | | | | |
|---|---|---|---|---|
| EP | 392594 | A2 | 10/1990 | |
| EP | 671555 | A1 | 9/1995 | |
| EP | 1972606 | A1 | 9/2008 | |
| GB | 1038490 | A | 8/1966 | |
| JP | 56-083516 | | 7/1981 | |
| JP | 61-023862 | A | 2/1986 | |
| JP | 02-259268 | A | 10/1990 | |
| JP | 02264124 | A * | 10/1990 | ............... F02B 75/02 |
| JP | 03115742 | A * | 5/1991 | ............... F02B 75/02 |
| JP | 03115743 | A * | 5/1991 | ............... F02B 75/02 |
| JP | 08-049623 | A | 2/1996 | |
| JP | 08-334077 | A | 12/1996 | |
| JP | 2004-324613 | A | 11/2004 | |
| KR | 2007-0026296 | A | 3/2007 | |
| KR | 2008-0073635 | A | 8/2008 | |
| RU | 2101526 | C1 | 1/1998 | |
| WO | WO-2008-017576 | A1 | 2/2008 | |

OTHER PUBLICATIONS

"P dV's Custom Data Acquisition Systems Capabilities." PdV Consulting. Accessed: Jun. 28, 2010. Printed: May 16, 2011. <http://www.pdvconsult.com/capabilities%20-%20daqsys.html>. pp. 1-10.

"Piston motion equations." Wikipedia, the Free Encyclopedia. Published: Jul. 4, 2010. Accessed: Aug. 7, 2010. Printed: Aug. 7, 2010. <http://en.wikipedia.org/wiki/Dopant>. pp. 1-6.

"Piston Velocity and Acceleration." EPI, Inc. Accessed: Jun. 28, 2010. Printed: May 16, 2011. <http://www.epi-eng.com/piston_engine_technology/piston_velocity_and_acceleration.htm>. pp. 1-3.

"SmartPlugs—Aviation." SmartPlugs.com. Published: Sep. 2000. Accessed: May 31, 2011. <http://www.smartplugs.com/news/aeronews0900.htm>. pp. 1-3.

(56) References Cited

OTHER PUBLICATIONS

Bell et al. "A Super Solar Flare." NASA Science. Published: May 6, 2008. Accessed: May 17, 2011. <http://science.nasa.gov/science-news/science-at-nasa/2008/06may_carringtonflare/>. pp. 1-5.
Birchenough, Arthur G. "A Sustained-arc Ignition System for Internal Combustion Engines." Nasa Technical Memorandum (NASA TM-73833). Lewis Research Center. Nov. 1977. pp. 1-15.
Britt, Robert Roy. "Powerful Solar Storm Could Shut Down U.S. For Months—Science News | Science & Technology | Technology News—FOXNews.com." FoxNews.com, Published: Jan. 9, 2009. Accessed: May 17, 2011. <http://www.foxnews.com/story/0,2933,478024,00.html>. pp. 1-2.
Brooks, Michael. "Space Storm Alert: 90 Seconds from Catastrophe." NewScientist. Mar. 23, 2009. pp. 1-7.
Doggett, William. "Measuring Internal Combustion Engine In-Cylinder Pressure with LabVIEW." National Instruments. Accessed: Jun. 28, 2010. Printed: May 16, 2011. <http://sine.ni.com/cs/app/doc/p/id/cs-217>. pp. 1-2.
Erjavec, Jack. "Automotive Technology: a Systems Approach, vol. 2." Thomson Delmar Learning. Clifton Park, NY. 2005. p. 845.
Hodgin, Rick. "NASA Studies Solar Flare Dangers to Earth-based Technology." TG Daily. Published: Jan. 6, 2009. Accessed: May 17, 2011. <http://www.tgdaily.com/trendwatch/40830-nasa-studies-solar-flare-dangers-to-earth-based-technology>. pp. 1-2.
Hollembeak, Barry. "Automotive Fuels & Emissions." Thomson Delmar Learning. Clifton Park, NY. 2005. p. 298.
InfraTec GmbH. "Evaluation Kit for FPI Detectors | Datasheet—Detector Accessory." 2009. pp. 1-2.
International Search Report and Written Opinion for PCT Application No. PCT/US2011/024797; Applicant: McAlister Technologies, LLC; Date of Mailing: Oct. 14, 2011; 8 pages.
Lewis Research Center. "Fabry-Perot Fiber-Optic Temperature Sensor." NASA Tech Briefs. Published: Jan. 1, 2009. Accessed: May 16, 2011. <http://www.techbriefs.com/content/view/2114/32/>.
Pall Corporation, Pall Industrial Hydraulics. "Increase Power Output and Reduce Fugitive Emissions by Upgrading Hydrogen Seal Oil System Filtration." 2000. pp. 1-4.
Riza et al. "All-Silicon Carbide Hybrid Wireless-Wired Optics Temperature Sensor Network Basic Design Engineering for Power Plant Gas Turbines." International Journal of Optomechatronics, vol. 4, Issue 1. Jan. 2010. pp. 83-91.
Riza et al. "Hybrid Wireless-Wired Optical Sensor for Extreme Temperature Measurement in Next Generation Energy Efficient Gas Turbines." Journal of Engineering for Gas Turbines and Power, vol. 132, Issue 5. May 2010. pp. 051601-1-51601-11.
Salib et al. "Role of Parallel Reformable Bonds in the Self-Healing of Cross-Linked Nanogel Particles." Langmuir, vol. 27, Issue 7. 2011. pp. 3991-4003.

\* cited by examiner

METHODS AND SYSTEMS FOR ADAPTIVELY COOLING COMBUSTION CHAMBERS IN ENGINES

CROSS-REFERENCE TO RELATED APPLICATIONS

The present application is a continuation of U.S. patent application Ser. No. 13/027,170, filed Feb. 14, 2011, now U.S. Pat. No. 8,297,265, which claims priority to and benefit of U.S. Patent Application No. 61/304,403, filed Feb. 13, 2010, and is a continuation-in-part of U.S. patent application Ser. No. 12/961,461 filed Dec. 6, 2010. Each of these applications is incorporated herein by reference in its entirety. To the extent the foregoing application and/or any other materials incorporated herein by reference conflict with the disclosure presented herein, the disclosure herein controls.

TECHNICAL FIELD

The following disclosure relates generally to methods and systems for cooling combustion chambers of internal combustion engines.

BACKGROUND

Fuel injection systems are typically used to inject a fuel spray into an inlet manifold or a combustion chamber of an engine. Fuel injection systems have become the primary fuel delivery system used in automotive engines, having almost completely replaced carburetors since the late 1980s. Conventional direct-injection fuel metering systems are typically connected to a pressurized fuel supply, and fuel injectors used in these fuel injection systems generally inject or otherwise release the pressurized fuel into the combustion chamber at a specific time relative to the power stroke of the engine. In many engines, and particularly in large engines, the size of the bore or port through which the fuel injector enters the combustion chamber is small. This small port accordingly limits the size of the components that can be used to actuate or otherwise inject fuel from the injector. Moreover, such engines also generally have crowded intake and exhaust valve train mechanisms, further restricting the space available for components of these fuel injection systems.

DETAILED DESCRIPTION

The present disclosure describes methods and systems for cooling combustion chambers of internal combustion engines. For example, several of the embodiments described below are directed generally to systems and methods that can inject a first fuel into a combustion chamber and adaptively a second fuel or coolant based on combustion chamber conditions. The second fuel or coolant produces cooling in the combustion chamber. Certain details are set forth in the following description and in FIGS. 1-7 to provide a thorough understanding of various embodiments of the disclosure. However, other details describing well-known structures and systems often associated with internal combustion engines, injectors, igniters, and/or other aspects of combustion systems are not set forth below to avoid unnecessarily obscuring the description of various embodiments of the disclosure. Thus, it will be appreciated that several of the details set forth below are provided to describe the following embodiments in a manner sufficient to enable a person skilled in the relevant art to make and use the disclosed embodiments. Several of the details and advantages described below, however, may not be necessary to practice certain embodiments of the disclosure.

Many of the details, dimensions, angles, shapes, and other features shown in the Figures are merely illustrative of particular embodiments of the disclosure. Accordingly, other embodiments can have other details, dimensions, angles, and features without departing from the spirit or scope of the present disclosure. In addition, those of ordinary skill in the art will appreciate that further embodiments of the disclosure can be practiced without several of the details described below. Furthermore, many features of the disclosure illustrated in the Figures are shown schematically.

Reference throughout this specification to "one embodiment" or "an embodiment" means that a particular feature, structure, or characteristic described in connection with the embodiment is included in at least one embodiment of the present disclosure. Thus, the occurrences of the phrases "in one embodiment" and "in an embodiment" in various places throughout this specification are not necessarily all referring to the same embodiment. Furthermore, the particular features, structures, or characteristics described with reference to a particular embodiment may be combined in any suitable manner in one or more other embodiments.

1. Systems and Methods for Adaptively Cooling Combustion Chambers

Figure 1:
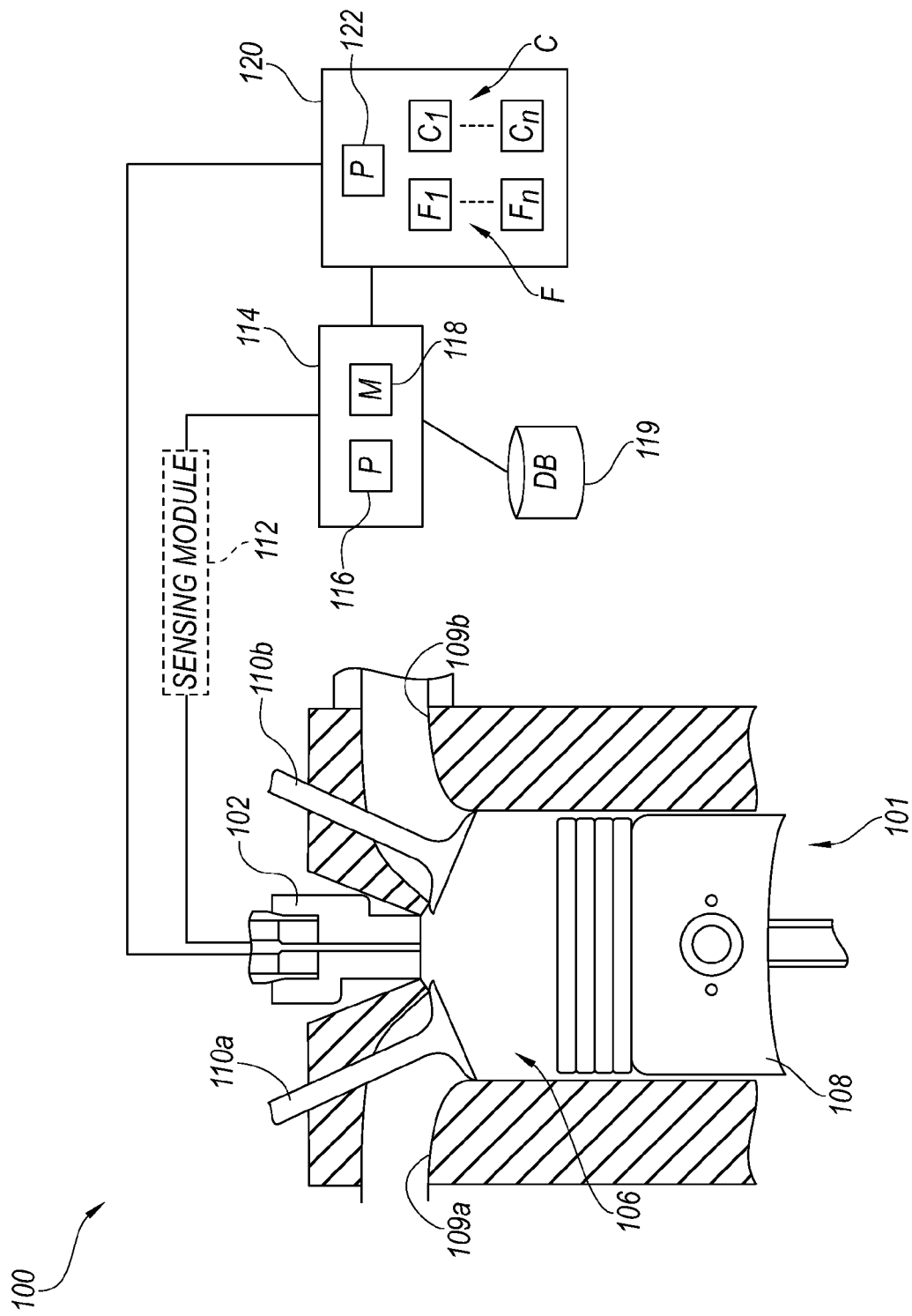
FIG. 1 is a schematic diagram of a system configured in accordance with an embodiment of the disclosure.

FIG. 1 is a schematic diagram of a system 100 configured in accordance with an embodiment of the disclosure for adaptively cooling or limiting the peak operating temperature of a combustion chamber 106. In the illustrated embodiment, the system 100 includes a portion of an engine 101 (e.g., a two or four stroke engine) having at least one reciprocating energy transfer device or piston 108 that moves at least partially within the corresponding combustion chamber 106. The system 100 also includes one or more air flow valves 110 (identified individually as a first valve 110a and a second valve 110b) that are operable to allow air flow to enter and exhaust gases to exit the combustion chamber 106. For example, the first valve 110a can be an intake valve that allows inlet air flow to enter the combustion chamber 106 via a first or intake passage 109a, and the second valve 110b can be an exhaust valve that allows air flow and/or exhaust to exit the combustion chamber 106 via a second or exhaust passage 109b. Although two valves are shown in FIG. 1A, one of ordinary skill in the art will appreciate that the system can include more than two valves 110.

The system 100 further includes an integrated injector igniter 102 ("injector 102") that is configured to inject fuel and/or coolant into the combustion chamber 106, as well as to ignite the fuel and/or coolant in the combustion chamber 106. In certain embodiments, the injector can include any of the features of the injectors described in U.S. patent application Ser. No. 12/961,461, entitled "INTEGRATED FUEL INJECTOR IGNITERS CONFIGURED TO INJECT MULTIPLE FUELS AND/OR COOLANTS AND ASSOCIATED METHODS OF USE AND MANUFACTURE," filed Dec. 6, 2010, and incorporated herein by reference in its entirety. In other embodiments, the injector 102 can include the features of any of the integrated injector igniters described in the co-pending patent applications incorporated by reference in their entireties above. For example, the injector 102 can include one or more integrated ignition features (e.g., for initiating a spark, plasma, or other suitable igniting event). According to embodiments of the present disclosure and as described in detail below, the injector 102 can also adaptively inject two or more fuels, coolants, or combinations of fuels and coolants into the combustion chamber 106 during operation. As used herein, the term coolant can include any temperature controlling fluid (e.g., gas or liquid) that produces cooling in the combustion chamber 106 (e.g., lowering a temperature in the combustion chamber and/or transferring heat away from components of the combustion chamber 106). In one embodiment, for example, a coolant can include non-combusting fluid. In other embodiments, however, a coolant can include a fuel that ignites and/or combusts at a lower temperature than another fuel that ignites and/or combusts in combustion chamber 106 prior to the injection of the coolant. In still further embodiments, a coolant can be a hydrogenous coolant (e.g., a hydrogen containing coolant). As described in detail below, the injector 102 can be controlled to adaptively adjust the pattern and/or frequency of the fuel/coolant injections based on properties in the combustion chamber 106.

In the embodiment shown in FIG. 1, the system 100 also includes a number of sensing and/or computing devices for adaptively controlling the fuel and/or coolant delivery and ignition in the combustion chamber 106. For example, the injector 102 can include one or more sensors that detect and communicate combustion chamber properties. More specifically, the injector 102 can include one or more fiber optic elements located on a distal end portion of the injector 102 exposed to an interface of the combustion chamber 106. As described in accordance with various embodiments herein, these sensors can also include various means and devices for measuring combustion chamber temperature and pressure including utilization of high frequency strobe of infrared IR, visible, and/or UV light transmitted by the fiber optic portion of the injector 102. For example, the means for measuring combustion chamber temperature and/or pressure can include a Fabry-Perot interferometer. In other embodiments, the temperature and/or pressure profiles within the combustion chamber 106 can be determined as a function of time or other parameters that can be measured using other types of suitable temperature and/or pressure sensors known in the art. Such temperature sensors can include, for example, various types of thermocouple, resistive, and IR devices, and such pressure sensors can include, for example, various types of transducer and piezoelectric devices.

In the illustrated embodiment, temperature and/or pressure data (or other combustion chamber properties) from the combustion chamber 106 can be processed by an optional sensing module 112 (shown in broken lines). Such processing can include, for example, filtering, converting, and/or formatting the data before transmitting it to a computer 114. The computer 114 can include one or more processors 116 for analyzing the data from the combustion chamber 106 to determine when and how to change injection and ignition characteristics from the injector 102. The results of the processing analysis can be stored in local memory 118 or an associated database 119.

According to additional features of the illustrated embodiment, the system 100 also includes a fuel source or fuel storage 120 that is operably coupled to the injector 102 to deliver fuel and/or coolant to the combustion chamber 106 via the injector 102. The fuel source 120 can store or otherwise provide access to one or more fuels F and/or one or more coolants C. Although the fuel source 120 is schematically illustrated with multiple fuels F and coolants C, one of ordinary skill in the art will appreciate that different fuels and/or coolants can be stored in separate containers. The fuel source 120 is also operably coupled to the computer 116 and can optionally include one or more processors 122 for selectively controlling the distribution of fuels F and/or coolants C to the injector 102.

Figure 2A:
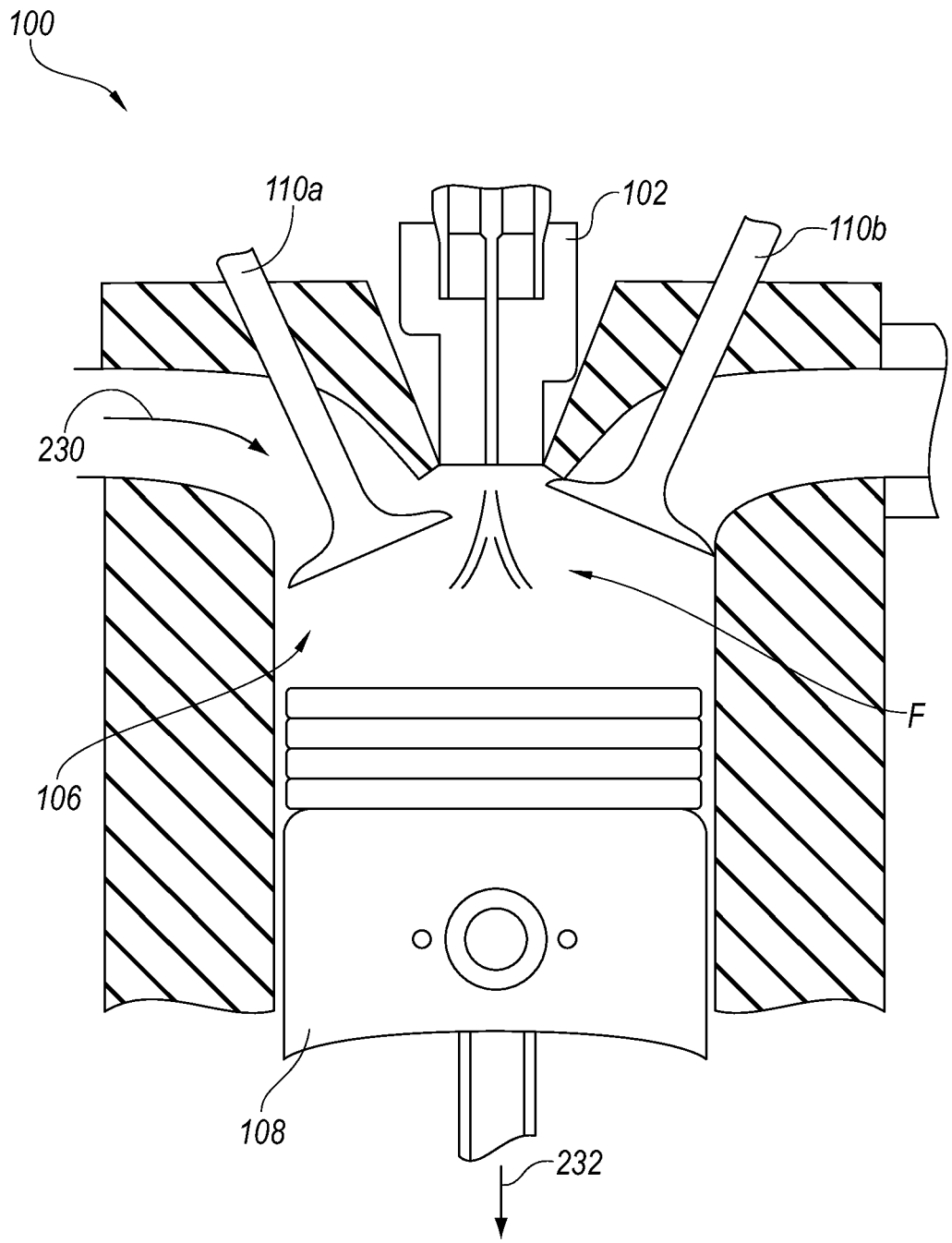
FIGS. 2A-2E are a series of schematic diagrams of an operational cycle of the system of FIG. 1 configured in accordance with embodiments of the disclosure.

Operation of the system 100 is described in detail below with reference to FIGS. 2A-2E. More specifically, FIGS. 2A-2E are a series of schematic diagrams of a portion of the system 100 of FIG. 1 illustrating an operational cycle including, for example, an intake stroke, a compression stroke, a power stroke, and an exhaust stroke. Referring first to FIG. 2A, FIG. 2A illustrates a direct-injection system 100 during an intake stroke of the cycle. During the intake stroke, the piston 108 begins at a top dead center ("TDC") position where the piston 108 creates a minimum volume of the combustion chamber (not shown in FIG. 2A). Fuel may be injected to produce a relatively homogeneous charge as the piston 108 moves away from TDC to expand the volume of the combustion chamber 106 (e.g., in the direction of arrow 232), the system 100 draws intake air flow 230 into the combustion chamber 106. Production of a relatively stratified charge of combustible fuel and air mixture is provided by fuel injection during the compression and/or power stroke that follows. More specifically, during the intake stroke the second valve 110b remains closed and the first valve 110a is at least partially opened to allow the intake air flow 230 to enter the combustion chamber 106 as the piston 108 moves away from TDC.

In certain embodiments, the system 100 is configured such that the valves 110 maintain an ambient pressure or a positive pressure in the combustion chamber 106 prior to a later combustion event. For instance, the system 100 can operate the intake stroke without throttling or otherwise impeding the intake air flow 230 into the combustion chamber 106 such that a vacuum is not created in the combustion chamber 106 during the intake stroke. Due to the ambient or positive pressure in the combustion chamber 106, an excess oxidant can form an insulative barrier adjacent to the surfaces of the combustion chamber (e.g., the cylinder walls, piston, engine head, etc.). As the piston 108 continues in the direction of arrow 232 and approaches or reaches bottom dead center ("BDC"), which is when the piston 108 is at the bottom of its stroke thereby resulting in a maximum volume of the combustion chamber 106, the first valve 110a closes to seal the combustion chamber 106.

In certain embodiments, the system 100 can further be configured to introduce fuel F into the combustion chamber 106 during the intake, compression, power, or exhaust strokes. For example, during predetermined operating conditions, such as a high load requirement or a high torque requirement, the injector 102 can dispense fuel F into the combustion chamber 106 during the intake of the air flow 230. Moreover, when introducing the fuel F the injector 102 can introduce a layered or stratified charge of the fuel F, into the combustion chamber 106, as well as other desired fuel distribution patterns and injection frequencies, as disclosed, for example, in the applications incorporated by reference above. In certain embodiments, introducing the fuel F into the combustion chamber 106 results in a homogenous air fuel mixture at combustion. In still further embodiments, however, the system 100 can operate such that the injector 102 meters fuel into the combustion chamber to produce a stratified charge during the compression and/or power stroke of the piston 108.

Figure 2B:
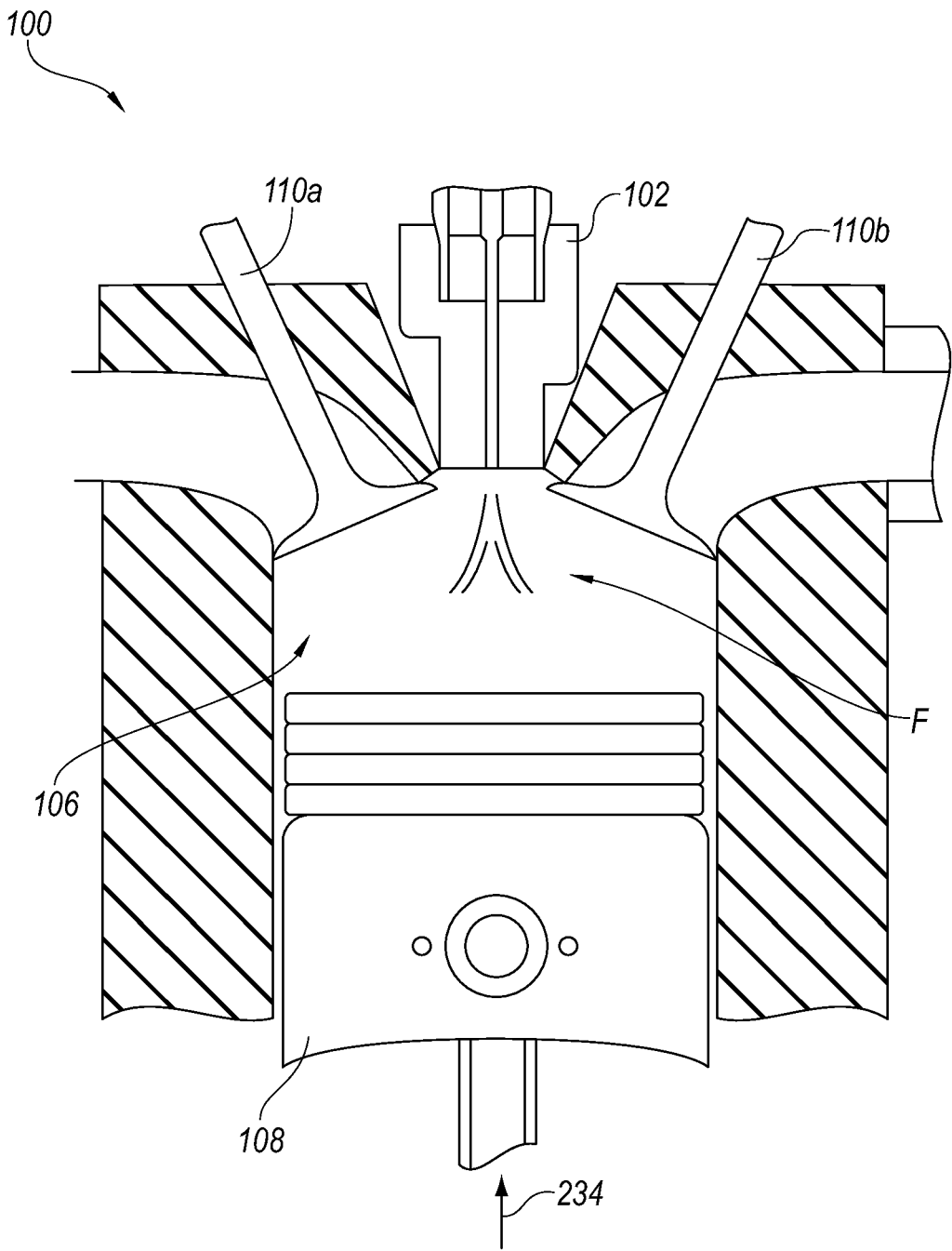

Referring next to FIG. 2B, FIG. 2B illustrates the system 100 during a compression portion or compression stroke of the cycle. During the compression stroke, the valves 110 are closed and the piston 108 moves away from BDC toward TDC (e.g., in the direction of arrow 234). As the piston 108 moves toward TDC, the piston 108 decreases the volume of the combustion chamber 106 and accordingly increases the pressure within the combustion chamber 106. In certain embodiments, during the compression stroke the injector 102 can dispense fuel F into the combustion chamber 106. For example, during predetermined operating conditions, such as for production of maximum fuel economy, particularly in conjunction with low load or low torque requirements, the injector 102 can dispense the fuel F during the compression stroke of the piston 108. Moreover, the injector 102 can dispense the fuel F in any desired distribution pattern, shape, stratified layers, etc., as noted above. As such, during the compression stroke the piston 108 can compress the air-fuel mixture as the piston 108 reduces the volume of the cavity 106. In other embodiments, however, the system 100 can operate such that the injector 102 does not introduce fuel F into the combustion chamber 106 during the compression stroke of the piston 108.

Figure 2C:
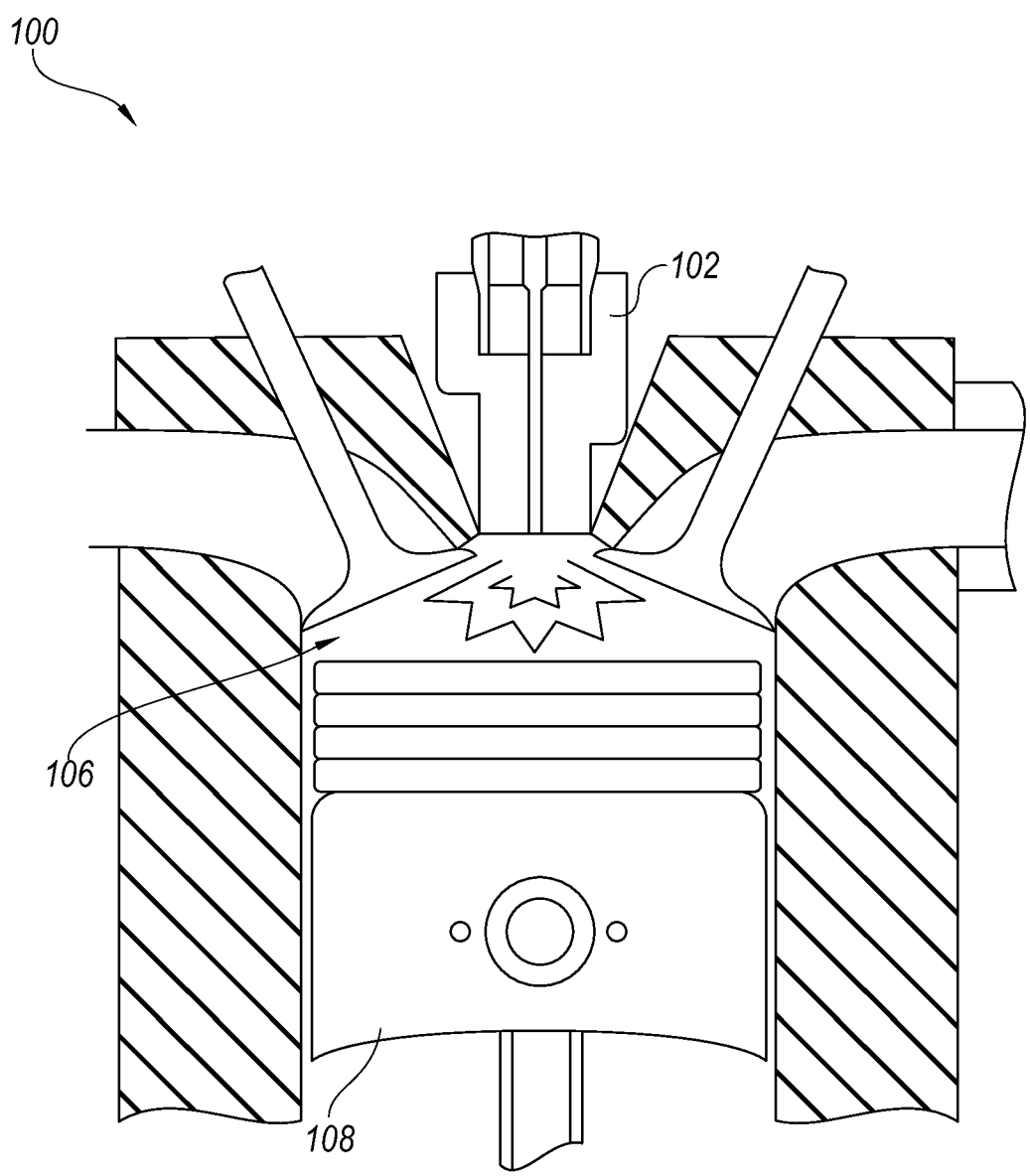

Referring next to FIG. 2C, as the piston 108 approaches or expands from TDC the injector 102 generates one or more ignition events to ignite or otherwise initiate combustion of the air fuel combination in the combustion chamber 106. For example, the injector 102 can include one or more integrated ignition features (e.g., features for initiating a spark, plasma, or other suitable igniting event) as disclosed in the applications incorporated by reference above. In certain embodiments, the injector 102 can generate the ignition event as the piston 108 reaches TDC. In other embodiments, however, the injector 102 can generate the ignition event before the piston 108 reaches TDC and/or after the piston 108 moves away from TDC.

Figure 2D:
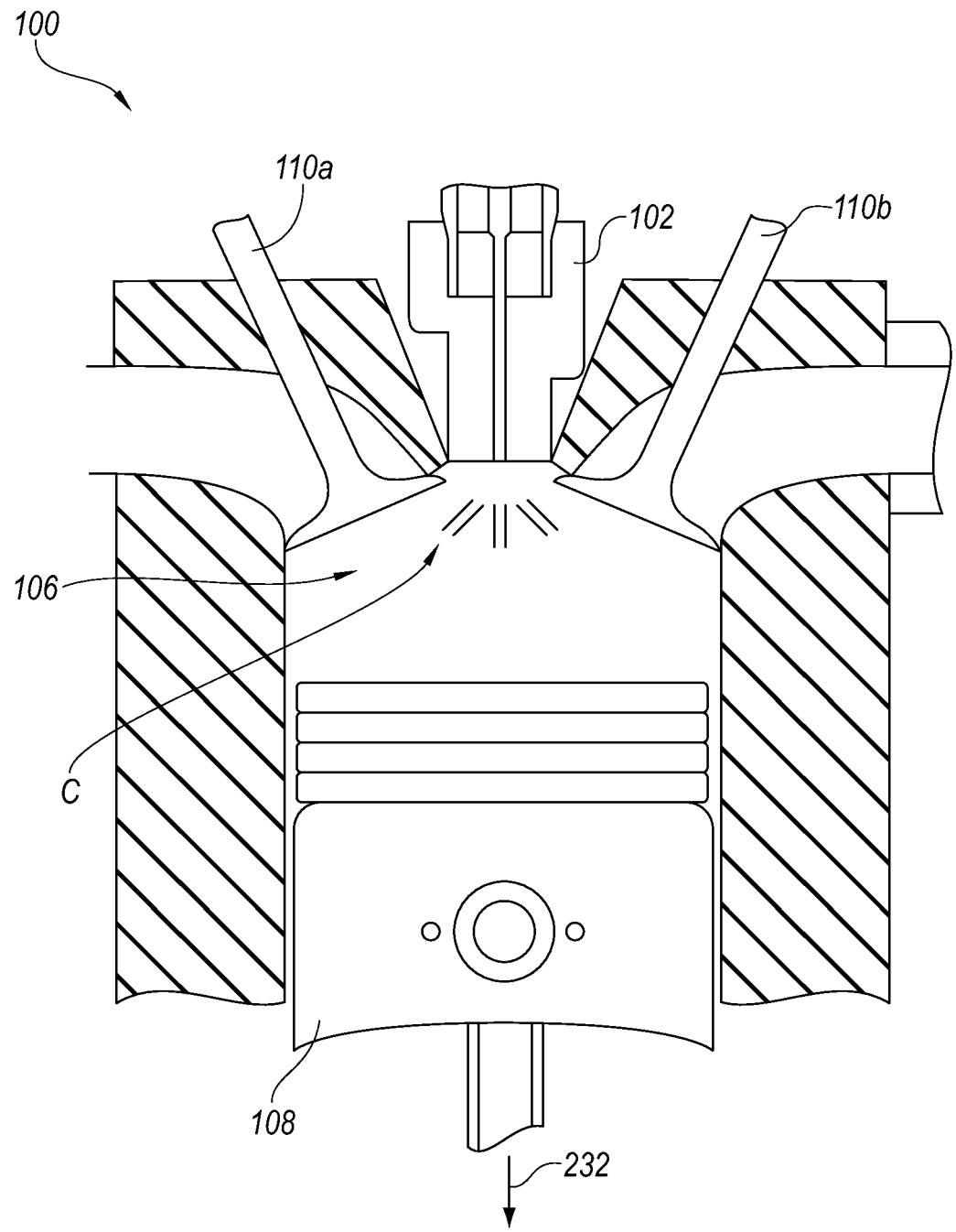

Referring next to FIG. 2D, FIG. 2D illustrates the system 100 during a power portion or power stroke of the cycle, which is the source of torque or power generated by the system 100. During the power stroke, the first and second valves 110 remain closed and the pressure resulting from the combustion of the compressed air fuel mixture forces the piston 108 toward BDC in the direction indicated by arrow 232. According to features of the illustrated embodiment, the injector 102 selectively dispenses coolant C directly into the combustion chamber 106 during the power stroke to cool the combustion chamber 106 or otherwise control or limit the peak combustion temperature. As described in detail below, under circumstances where the injector 102 dispenses the coolant C during the power stroke, the system 100 can adaptively determine which power strokes the injector 102 will dispense the coolant C. For example, the system 100 may sense the temperature of combustion chamber components to determine that the injector 102 should dispense the coolant C during every third power stroke during operation of the system 100. In other embodiments, however, the system 100 may determine the need to inject the coolant C more frequently (e.g., during each power stroke or during every second power stroke) or less frequently (e.g., during every fourth or greater power stroke). The determination of when to inject the coolant C can accordingly be adaptively determined and controlled based on the operating conditions of the system 100. In still further embodiments, the determination of when to inject the coolant can be correlating or otherwise determining the combustion chamber temperature to an acceleration of a power train component of the system, as described in U.S. patent application Ser. No. 12/804,508, titled "METHODS AND SYSTEMS FOR REDUCING THE FORMATION OF OXIDES OF NITROGEN DURING COMBUSTION IN ENGINES," filed Jul. 21, 2010, and incorporated herein by reference in its entirety.

Although additional advantages of injecting the coolant C in accordance with embodiments of the disclosure are discussed in detail below, one advantage of injecting the coolant C during the power stroke is the ability to improve the volumetric efficiency and specific capacity rating of the combustion in the combustion chamber 106. For example, selectively cooling the combustion chamber 106 during the power stroke allows for more fuel to burn per cycle or unit time out of the same volume in comparison with conventional high temperature conditions that limit the amount of fuel that burns. Allowing more fuel to burn during the power stroke accordingly provides more power output from the system. A corollary advantage is that the combustion chamber components become a type of thermal flywheel that provides rapid heating of the coolant C to produce expansion and work to increase the net power production of the engine.

Figure 2E:
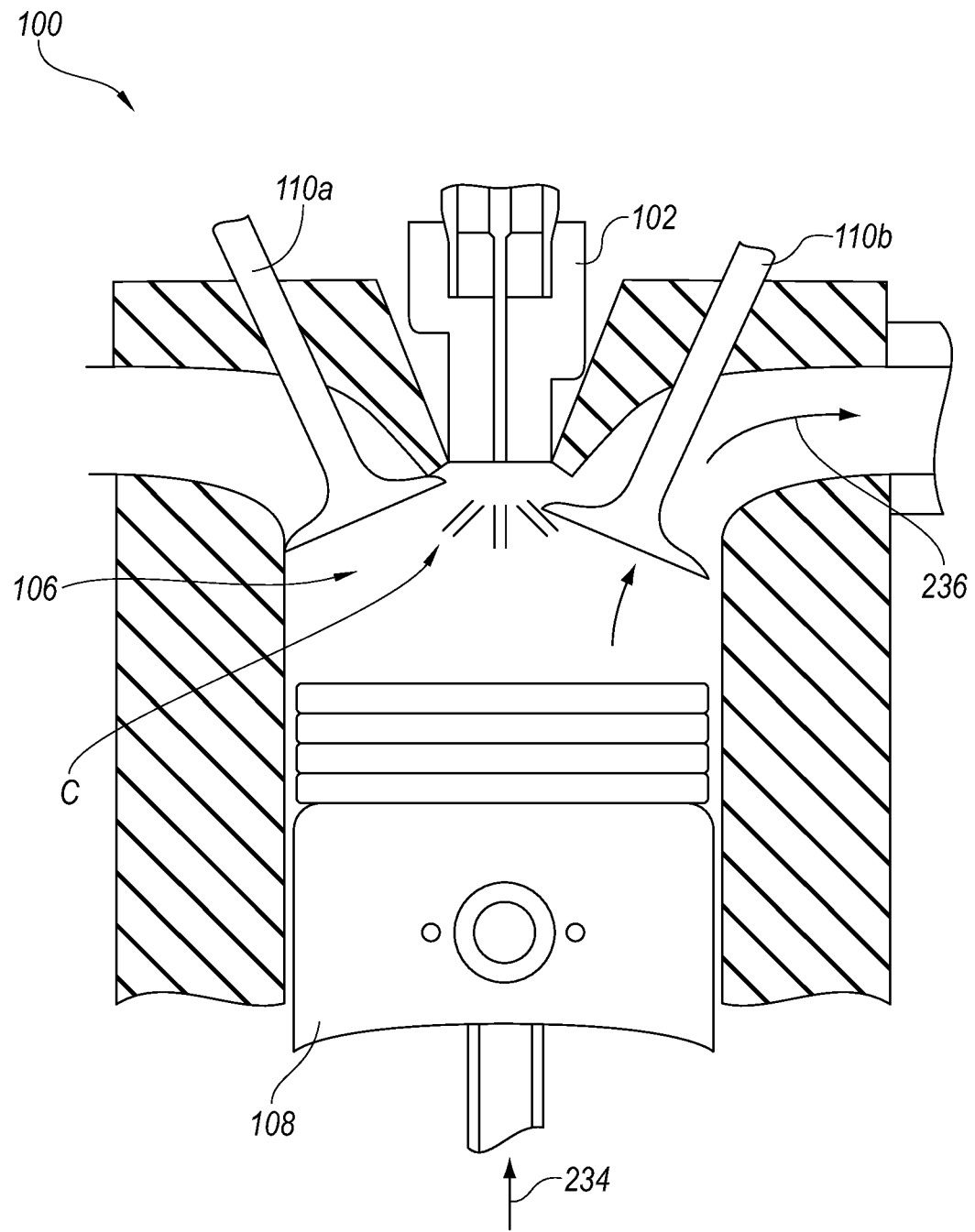

Referring next to FIG. 2E, FIG. 2E illustrates the system 100 during an exhaust portion or exhaust stroke of the cycle. During the exhaust stroke, the first valve 110a remains closed and the second valve 110b opens and the piston 108 returns to TDC (e.g., in the direction of the arrow 234). As the piston 108 reduces the volume of the combustion chamber 106 with the second valve 110b open, an exhaust air flow 236 removes the combustion products from the combustion chamber 106. According to features of the illustrated embodiment, the injector 102 can selectively dispense coolant C directly into the combustion chamber 106 during the exhaust stroke to cool the combustion chamber 106 or otherwise control or limit the peak temperature of the combustion chamber 106. As described in detail below, under circumstances where the injector 102 dispenses the coolant C during an exhaust stroke, the system 100 can adaptively determine which exhaust strokes the injector 102 will dispense the coolant C. For example, the system 100 may determine that the injector 102 should dispense the coolant C during every third exhaust stroke during operation of the system 100. In other embodiments, however, the system 100 may determine the need to inject the coolant C more frequently (e.g., during each exhaust stroke or during each second exhaust stroke) or less frequently (e.g., during every fourth or greater exhaust stroke). In still further embodiments, the injection of coolant C during an exhaust stroke can immediately follow the injection of coolant C during a power stroke.

As explained above, systems configured in accordance with embodiments of the disclosure adaptively dispense coolant into the combustion chamber during the power stroke and/or the exhaust stroke portions of the cycle. These systems, however, do not inject the coolant during the intake stroke and/or compression stroke portions of the cycle, although in certain embodiments these systems could be modified to inject coolant during the intake stroke and/or compression stroke. Moreover, these systems can detect specific conditions that require injecting the coolant during the power stroke and/or the exhaust stroke. In this manner, these systems can adaptively or reactively control the timing of the coolant injection, the amount of injected coolant, the distribution pattern of injected coolant, etc. Moreover, the operating conditions can include, for example, the temperature in the combustion chamber as well as other properties that can be correlated or that otherwise relate to the combustion chamber temperature. Other factors that influence the adaptive control of the coolant injection can include the engine's power demand, type of coolant, coolant density, coolant viscosity, combustion chamber geometry including the piston geometry, resonance, piston position and speed, etc. An additional factor can include the amount of surplus air in the combustion chamber that forms an insulative envelope around the combustion. For example, these systems can adaptively inject the coolant in response to determining that an insufficient insulative surplus air envelope exists in the combustion chamber thereby resulting in one or more quench regions in the combustion chamber. Moreover, although features of the embodiments described herein are described with reference to the intake, compression, power, and exhaust strokes or portions of a cycle, one of ordinary skill in the art will appreciate that these strokes can be portions of four stroke or two stroke engines, in addition to other types of engines. Accordingly, embodiments of the present disclosure are not limited solely to engines that operate in a four stroke configuration.

Systems configured in accordance with embodiments of the disclosure that selectively and adaptively cool the combustion chamber by injection coolant during a power or exhaust stroke provide several advantages. One advantage, for example, is that the selective cooling improves the volumetric efficiency of the air fuel charge, as well as the specific capacity rating of the cycle. Additional benefits include preventing fouling of surfaces in the combustion chamber, as well as preventing pre-ignition of the fuel by reducing the operating temperatures. Moreover, such embodiments can eliminate parasitic losses resulting from conventional cooling components of an engine. For example, a system or engine configured in accordance with embodiments of the disclosure may eliminate the need for a radiator, water pump, water jacket, air pump, heat exchanger fins, or similar heat exchanging components that otherwise draw energy from the system. In addition to eliminating these parasitic energy losses, eliminating these or similar components reduces the weight of the system, as well as the capital investment for manufacturing, sourcing, and installing these components along with elimination or reduction of associated failures and maintenance costs of conventional cooling system components.

Additional benefits include increasing the longevity of the system, and in particular, increasing the longevity of components that are particularly susceptible to wear and fatigue. For example, the selective cooling during the power and/or exhaust strokes as disclosed herein can reduce the operating temperature of the piston, piston rings, oil, valve heads, engine head, etc. Moreover, the piston can reciprocate or otherwise operate in the combustion chamber at a higher frequency to burn more overall fuel resulting in greater power output of the engine under high load conditions. Furthermore, and as noted above, the coolant can be injected during the power and exhaust strokes without creating fouling or other undesirable effects in the combustion chamber. For example, when the injector dispenses the coolant in a layered or stratified charge, an insulative layer of air in the combustion chamber can protect the surfaces of components in the combustion chamber. Another advantage resulting from embodiments of the present disclosure is the ability to limit the peak combustion chamber temperature to a predetermined value, such as 2200 degrees C. or less, for example, to avoid the formation of oxides of nitrogen. A further benefit of the methods and systems described herein is that they stop, or at least reduce, the formation of oxides of nitrogen at the source (i.e., in the combustion chamber), in contrast to conventional methods that focus on cleaning harmful emissions from the exhaust.

Figure 3:
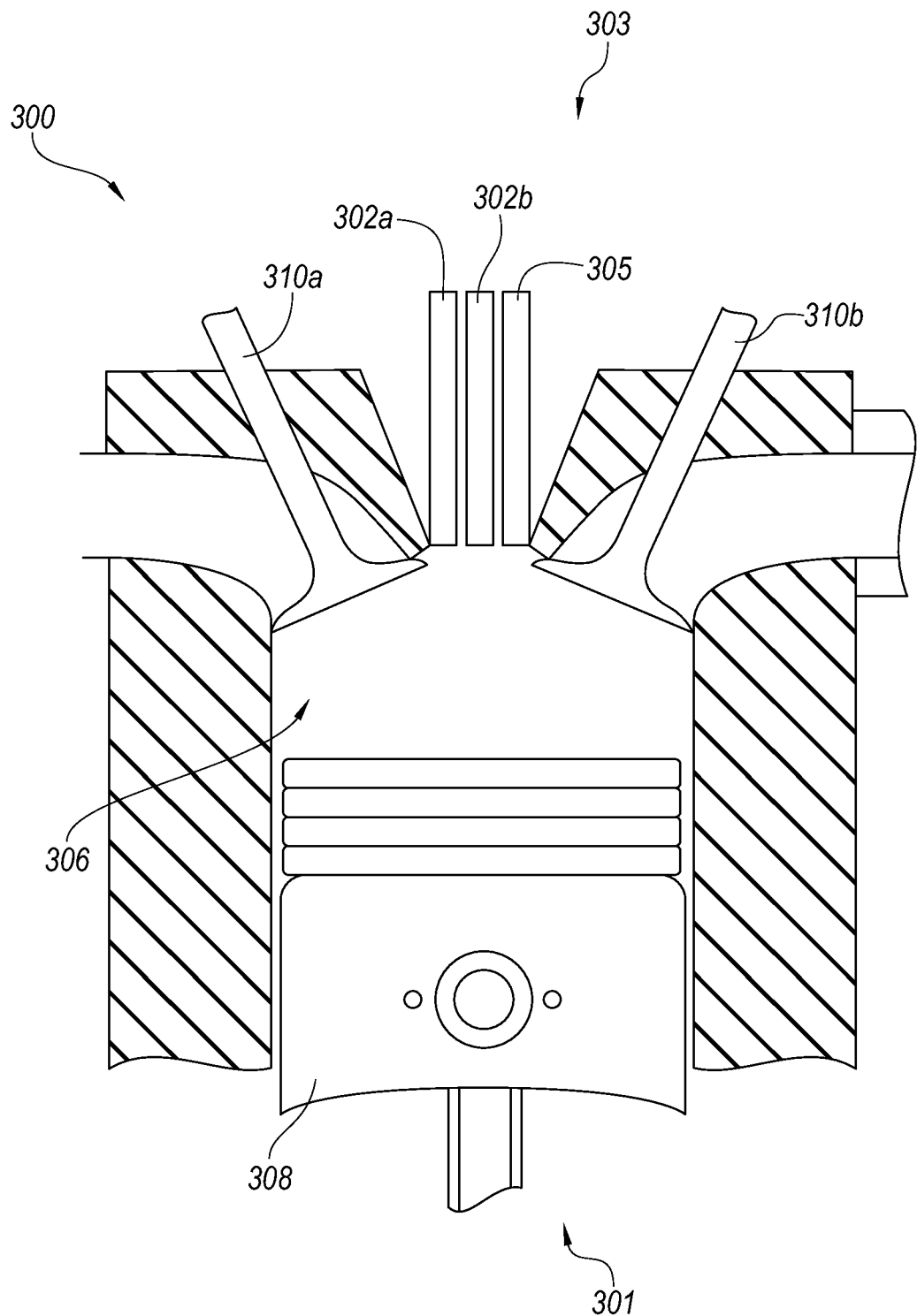
FIG. 3 is a schematic diagram of a system configured in accordance with another embodiment of the disclosure.

FIG. 3 is a schematic diagram of a system 300 configured in accordance with another embodiment of the disclosure. The system 300 includes several features that are generally similar in structure and function to the corresponding features of the system 100 described above with reference to FIGS. 1-2E. For example, the system 300 includes an engine 301 with a piston 308 that moves relative to a combustion chamber 306 through intake, compression, power, and exhaust events of two or four stroke operation. For purposes of illustration, the system also includes one or more air flow valves 310 (identified individually as a first air flow valve 310a and a second air flow valve 310b) that are operable to allow air flow into and out of the combustion chamber 306. In the illustrated embodiment, however, the system 300 also includes an injection and ignition subassembly 303. More specifically, the subassembly 303 includes a first injector 302a, a second injector 302b, and an igniter 305. In certain embodiments, the first injector 302a can dispense a first fuel into the combustion chamber 306 and the second injector 302b can dispense a coolant into the combustion chamber 306. Moreover, the igniter 305 can ignite the fuel and/or coolant that the first and second injectors 302a, 302b dispense into the combustion chamber 306. Although FIG. 3 illustrates the first injector 302a, the second injector 302b, and the igniter 305 as separate components, in certain embodiments one or more of these components can be integral parts of a single component. For example, the first injector 302a and the second injector 302b can be a single injector separate from the igniter 305. In other embodiments, however, one of the first and second injectors 302a, 302b can be combined with the igniter 305 and separate from the corresponding first or second injector 302a, 302b. In still further embodiments, the igniter 305 can be omitted from the system 300 and the ignition can be compression based. In still further embodiments, the igniter 305 can be a glow plug or similar component to at least partially aid in a compression based ignition system.

Figure 4:
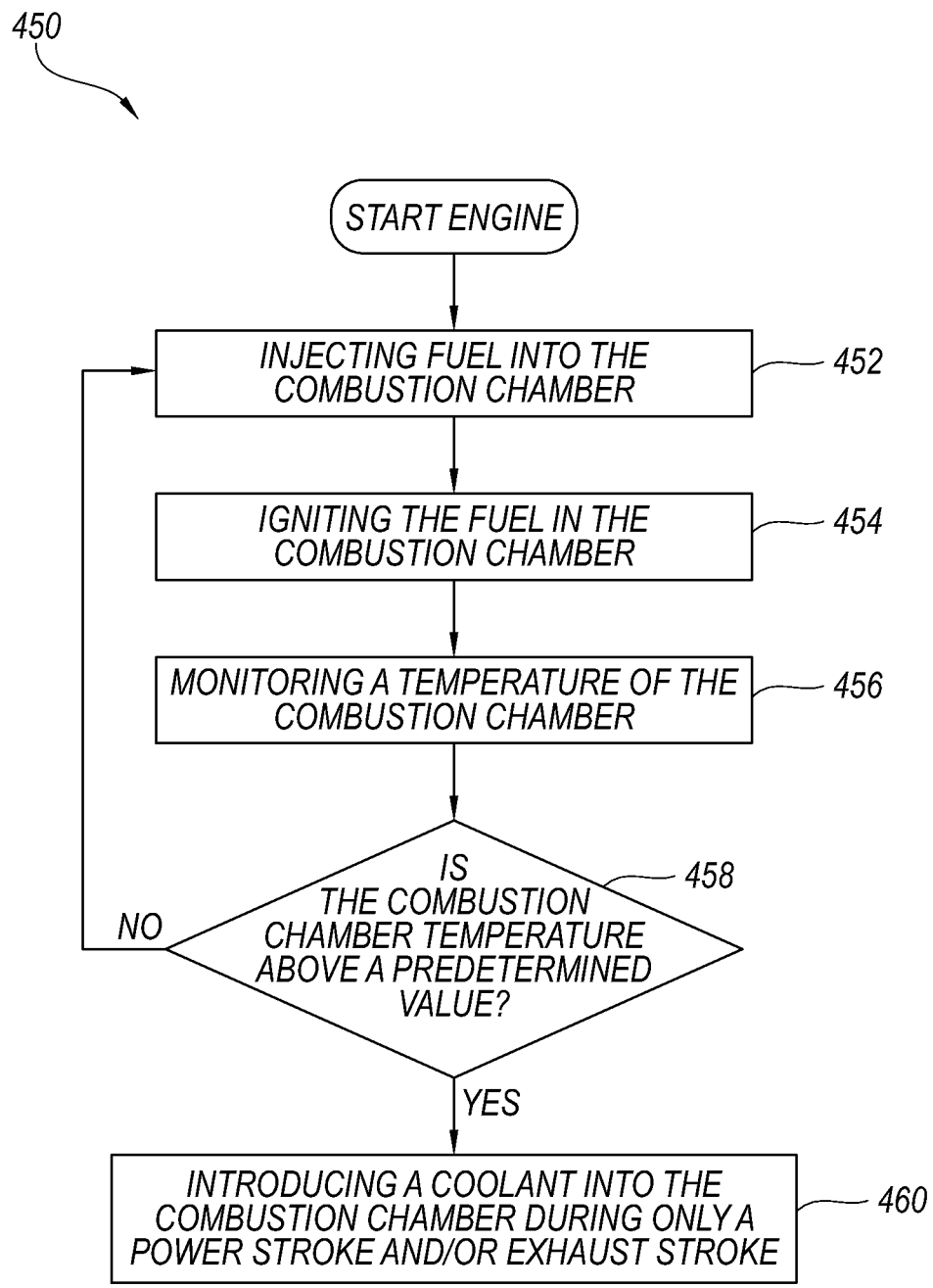
FIG. 4 is a flow diagram of a method for cooling a combustion chamber of an engine in accordance with an embodiment of the disclosure.

FIG. 4 is a flow diagram of a routine or method 450 for cooling a combustion chamber of an engine in accordance with an embodiment of the disclosure. The routine 450 can be controlled or performed by an engine management computer, engine control unit (ECU), Application-Specific-Integrated-Circuit (ASIC), processor, computer, and/or other suitable programmable engine control device. The method 450 can be used to cool a combustion chamber in which a piston or other reciprocating energy transfer device moves through a cycle including an intake, compression, power, and exhaust stroke as generally described above. For example, the method 450 includes injecting fuel into a combustion chamber (block 452). As described in detail above with reference to FIGS. 1-2E, an integrated injector/igniter can dispense the fuel into the combustion chamber during the intake and/or compression strokes of the piston during a cycle. More specifically, for example, under high load or torque requirements the injector can dispense at least a portion of the fuel into the combustion chamber during the intake stroke to develop a homogenous charge of fuel and air. At times that higher fuel economy is desired and/or under lower power or torque requirements the injector can dispense the fuel during the compression stroke in a stratified or layered pattern. The method 450 also includes generating an ignition event to ignite the fuel in the combustion chamber (block 454). In certain embodiments, the injector that dispensed the fuel into the combustion chamber can also generate the ignition event to ignite the fuel. In other embodiments, however, a separate ignition source can be used to ignite the fuel air charge in the combustion chamber. Moreover, the ignition event can be generated as the piston reaches TDC in the compression stroke, as well as before and/or after the piston reaches TDC in the compression stroke.

The method 450 further includes monitoring a temperature of the combustion chamber (block 456). Monitoring the temperature can include, for example, directly monitoring the temperature of the combustion chamber with one or more sensors carried by the injector or by other components of the combustion chamber. In other embodiments, monitoring the temperature of the combustion chamber can include detecting or monitoring combustion chamber properties such as pressure, optical and/or acoustical properties, etc. that can be correlated to the combustion chamber temperature. The method 450 additionally includes determining if the combustion chamber temperature is at or above a predetermined value (decision block 458). In certain embodiments, for example, it may be desirable to determine if the temperature in the combustion chamber reaches 2200 degrees C., which is the threshold for forming oxides of nitrogen. In other embodiments, however, the predetermined value of the temperature can be greater than or less than 2200 degrees C.

When the system determines that the temperature is below or at the predetermined value, the method includes continuing to operate through the intake, compression, power, and exhaust strokes of the cycle, and injecting and igniting fuel as described above. However, when the combustion chamber temperature is above or approaching the predetermined value, the method further comprises adaptively introducing a coolant into the combustion chamber during only one of a power stroke and/or an exhaust stroke of the cycle (block 460). The method can also include dispensing the coolant during the power stroke and/or the exhaust stroke if the system determines that the zone of combustion exceeds the surplus air insulation envelope and approaches a quench region. In certain embodiments, the injector that dispenses the fuel and/or that ignites the fuel can also dispense the coolant. As also noted above, the coolant can include any fluid (e.g., gas or liquid) that produces cooling in the combustion chamber by transferring heat away from components of the combustion chamber. For example, the coolant can include non-combusting fluid. In other embodiments, however, the coolant can include a fuel that ignites and/or combusts at a lower temperature than the fuel that is introduced into the combustion chamber during the intake and/or compression strokes. In still further embodiments, the coolant can be a hydrogenous (e.g., a hydrogen containing component) coolant.

In addition to adaptively injecting the coolant in response to the combustion chamber temperature, the method 450 can also include adaptively controlling a frequency of the bursts of coolant into the combustion chamber. The method 450 can further include adaptively controlling a distribution pattern or spray of the coolant into the combustion chamber. For example, if the system determines that the combustion chamber is approaching a temperature limit or a quench zone or a portion of the combustion chamber that has a relatively higher temperature, the system can adaptively control the frequency, direction, amount, and/or pattern of the coolant distribution to target the region of the elevated temperature. More specifically, several of the injectors as described in the patent applications incorporated by reference above disclose features for adaptively actuating or controlling valves of injectors, which can be used in injectors according to embodiments of the present disclosure. After injecting the coolant into the combustion chamber to lower the peak temperature of combustion, and/or of combustion chamber components, the method 450 can return to block 452 and repeat.

In still further embodiments, the method can include injecting the coolant into the combustion chamber under predetermined conditions other than the combustion chamber temperature. For example, when an engine is under a predetermined power load, such as a high power load or high torque load resulting from rapid acceleration, towing, ascending a hill, etc., the method can include injecting the coolant during every power stroke and/or exhaust stroke. Under relatively lower power or torque loads the method can include injecting the coolant less frequently (e.g., during every fourth or greater power stroke).

2. Additional Embodiments of Systems and Methods for Adaptively Cooling Combustion Chambers According to additional embodiments of the disclosure, a method of controlling a temperature in a combustion chamber in an engine can include injecting coolant into the combustion chamber during a power stroke and/or exhaust stroke during a predetermined operational condition of the engine. In these embodiments, for example, the coolant injection can be based on the operational condition of the engine, rather than or in addition to the temperature of the combustion chamber. More specifically, a method of controlling a temperature in a combustion chamber can include introducing fuel into the combustion chamber of an engine, wherein an energy transfer device such as a rotor, piston, or other component moves at least partially within the combustion chamber through intake, compression, power, and exhaust events, and causing the fuel to combust in the combustion chamber. The method can further include monitoring the engine for a predefined operational condition of the engine. In certain embodiments, the predefined operational condition can include an increased power or torque requirement. For example, the predefined operational condition can include accelerating, ascending a hill, towing a trailer or other load, and/or other high power or high torque requirements. When the engine operates in the predefined operational condition, the method further includes introducing coolant into the combustion chamber only during at least one of the power stroke and the exhaust stroke.

According to additional embodiments, the method can further include monitoring a temperature of the combustions chamber in addition to the operational condition of the engine, and when the temperature reaches a predetermined value, introducing coolant into the combustion chamber only during at least one of the power stroke and the exhaust stroke. Moreover, introducing coolant into the combustion chamber can include introducing a coolant that does not combust in the combustion chamber. Furthermore, introducing fuel into the combustion chamber can include introducing fuel that generates a first temperature of combustion in the combustion chamber, and introducing coolant into the combustion chamber can include introducing coolant that generates a second temperature of combustion in the combustion chamber, the second temperature being less than the first temperature. In addition, introducing coolant into the combustion chamber can include introducing a coolant at least partially containing hydrogen.

According to further embodiments of the present disclosure, methods and systems can be directed to injecting a coolant or temperature controlling fluid into the combustion chamber during a power stroke and/or exhaust stroke when the temperature is below an ideal operating temperature. For example, in certain situations, an ideal operating temperature of a combustion chamber may be less than a maximum operating temperature or other predefined maximum temperature, such as 2200 degrees C., which is the threshold temperature for the formation of oxides of nitrogen ($NO_x$). Although operating at or near 2200 degrees C. may be beneficial, in certain embodiments the operating temperature can be controlled to be lower for the purpose of obtaining more specific power out of the engine by improving the volumetric efficiency and specific capacity rating of the combustion in the combustion chamber. This control of the combustion chamber can be achieved by injecting the coolant or other temperature controlling fluid only during the power stroke and/or exhaust stroke.

Figure 5:
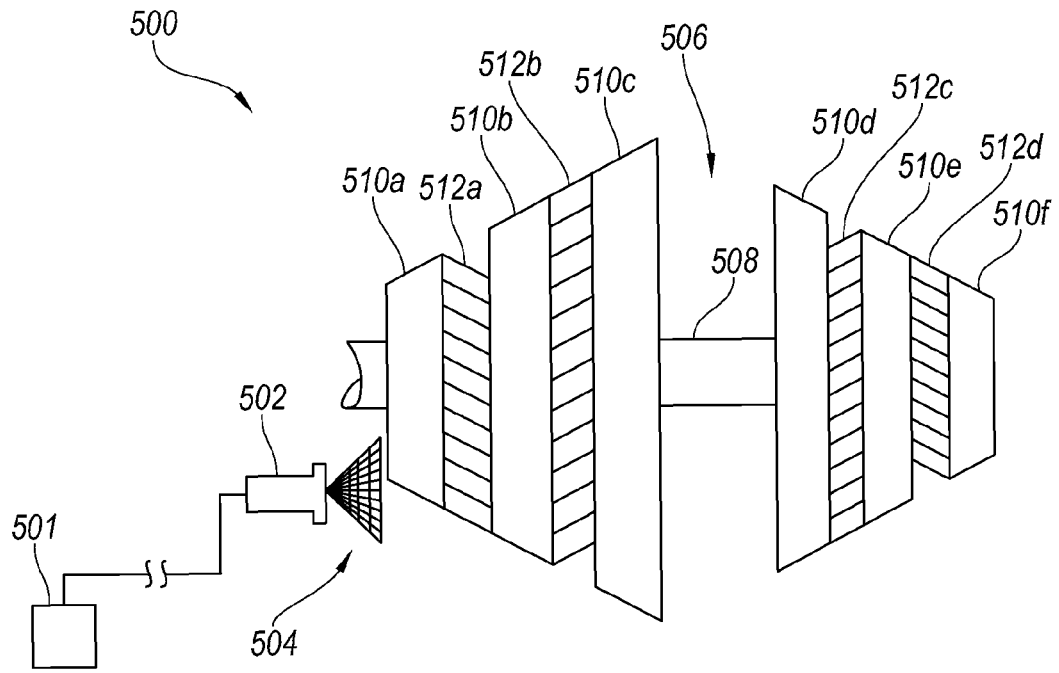
FIGS. 5 and 6 are schematic diagrams of systems configured in accordance with additional embodiments of the disclosure.

FIG. 5 is a schematic diagram of a system 500 including a turbine 506 configured in accordance with another embodiment of the disclosure. The turbine 506 illustrated in FIG. 5 can be operated with a coolant or temperature controlling fluid as disclosed above. More specifically, in the illustrated embodiment the system 500 includes a fuel source 501 that is coupled to an injector 502. The fuel source can store one or more fuels and coolants. The injector 502 can include any of the features described above, including the features of any of the injectors described in the applications incorporated herein by reference and directed to adaptively injecting multiple fuels and/or coolants, as well as igniting the fuels and coolants. For example, the injector 502 is configured to inject a fuel or coolant thereby generating an injection event 504 (e.g., injected fuel and/or coolant). In some embodiments, the injection event 504 can also include ignition of the fuel and/or coolant thereby producing a combustion event.

In the illustrated embodiment, the turbine 506 includes multiple rotors 510 and stators 512 (identified individually as first through sixth rotors 510a, 510b, 510c, 510d, and 510f and first through fourth stators 512a, 512b, 512c, and 512d). The rotors 510 and corresponding stators 512 are carried by a shaft 508 (e.g., drive shaft, output shaft, etc.) that can transfer rotational energy from the rotors 510 during operation. The turbine 500 may be a stand-alone system that drives one or more loads such as a generator or compressor. In other embodiments, the turbine 500 may be utilized, for example, as a turbocharger for another engine such as engine 100 or 300 as described above with reference to FIGS. 1-3.

For example, the injection event 504 can generate combustion that drives or rotates the rotors 510. During operation, the rotors 510 or other portions of the turbine 506 can develop hot or elevated temperature sections that lead to inefficiencies of the turbine 506 and/or increased or premature wear of components of the turbine 506. According to embodiments of the present disclosure, rather than injecting a fuel and igniting the fuel for the injection event 504, the injector 502 can be configured to inject a coolant or temperature controlling fluid directly into a hot section of one or more of the rotors 510. As described above, a coolant can include a combustible fuel or other fluid that ignites and combusts at a lower temperature than other fuels that are used during operation. Accordingly, the direct injection of the coolant at or near the rotors 510 can provide beneficial and adaptive cooling of the turbine during operation for improved power output and increased rotor 510 and other component wear.

In additional embodiments, the coolant that is introduced at the turbine 506, and more specifically at the rotors 510, can include a coolant that is exhausted from a combustion chamber of an internal combust chamber, including for example, the combustion chambers described above regarding operation of engines 100 or 300. For example, in any of the embodiments of combustions chambers described above with reference to FIGS. 1-4, exhaust from the combustion chamber can include excess air or excess fuel such as hydrogen, as well as other liquid and gaseous coolants. These exhaust coolants can be introduced into the turbine 506 when the turbine 506 is downstream or in a cascaded configuration with one or more upstream combustion chambers. As such, exhaust coolants from a combustion chamber can accordingly be introduced into the hot sections of the turbine 506, including for example, at the rotors 510, to reduce operating temperatures for improved performance and increased longevity.

Figure 6:
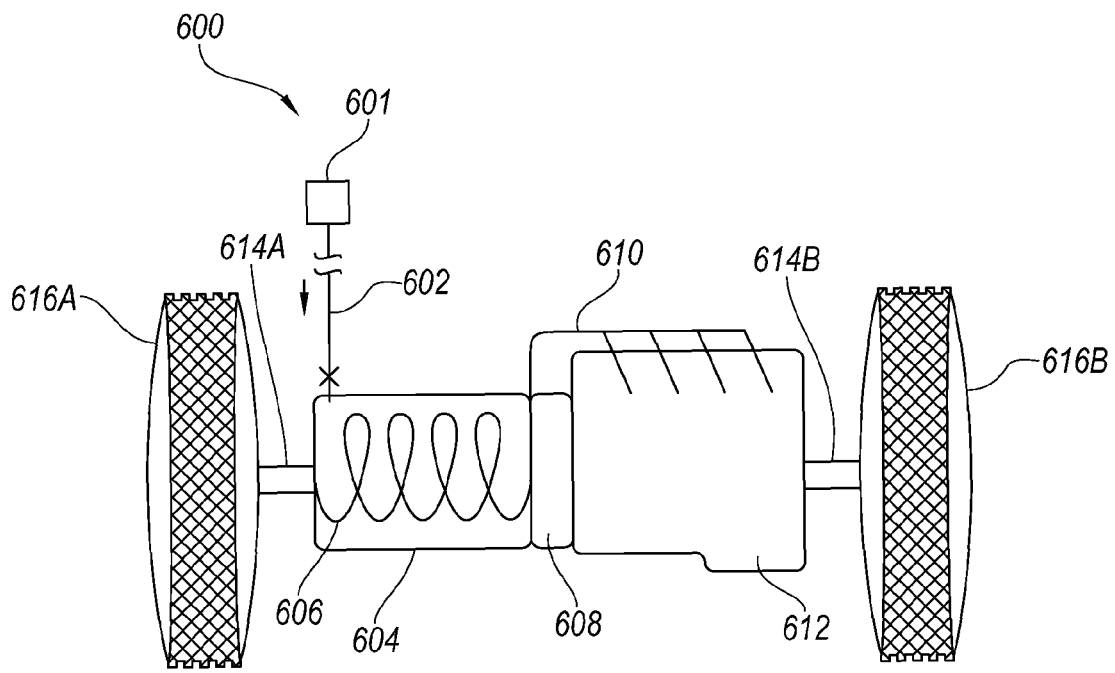

FIG. 6 is a schematic diagram of a system 600 configured in accordance with yet another embodiment of the disclosure. According to several features of the illustrated embodiment, the system 600 is configured for cooling one or more electrical generating or conditioning components with a coolant, and subsequently cooling a combustion chamber with the same coolant via direct injection as described above with reference to FIGS. 1-4. For example, hybrid, electrical drive, and regenerative drive or braking systems can include several electricity generating components such as alternators, transformers, batteries, electrical generators, fuel cells, etc. Similar to the embodiments described above, the coolant can include any temperature controlling fluid or gas, including, for example, hydrogen.

In the illustrated embodiment, the system 600 includes a coolant source 601 coupled to an electrical generating component 604 via a coolant inlet conduit or line 602. The electrical generating component 604 can include one or more electrical circuits 606. The system 600 can further include a management clutch system 608 inline or coupled to the braking and/or electrical generating component, as well as at least a portion of an internal combustion engine 612 including one or more combustion chambers, energy transferring devices, injector, etc. as described above with reference to FIGS. 1-4. The management clutch system 608 is configured to manage or distribute power to one or more power output components of the system 600, and is intended to be representative of at least one hybrid engine component that can benefit from the upstream cooling from the electrical generating component 604 to the engine 612. The system 600 also includes a coolant delivery conduit, rail, or line 610 fluidly coupled to the electrical generating component 604 and/or the management clutch system 608. The coolant line 610 is also fluidly coupled to the engine 612 to deliver the coolant from the electrical generating component 604 and/or the management clutch system 608 to the engine 612. The system 600 further includes an output shaft 614 (portions of which are identified individually as 614A and 614B) that transfers or delivers output energy from the electrical generating component 604 and/or engine 612 to an energy transfer component, such as one or more drive wheels 616 (identified individually as a first drive wheel 616A and a second drive wheel 616B). The clutch management system 608 is configured to allow or manage various operational conditions of the drive wheels 616. For example, in certain embodiments, the clutch management system 608 can allow for an electric drive and/or an engine on each of the drive wheels 616 to be at the same or at a different RPM, as well as for an electric drive to be on one of the drive wheels 616 and an engine drive to be on the other drive wheel 616. The clutch management system 608 can further allow or manage regenerative braking by the electrical generating component 604 on either of the drive wheels 616.

In operation, the electrical generating component 604 and/or the management clutch system 608 generate heat. As the temperature of these components increases or during other predetermined operational conditions, the coolant inlet line 602 delivers coolant to the electrical generating component 604 and/or the management clutch system 608 to cool or otherwise control the operating temperature of these components. The coolant can circulate through or around these components, and then be delivered downstream to the engine 612 (or, for example a turbine system such as the turbine 500 discussed above with reference to FIG. 5) via the coolant delivery line 610. At the engine 612, the coolant can be injected as described above with reference to FIGS. 1-4, including, for example, only during at least one of the exhaust and power strokes of a piston moving relative to a combustion chamber, to thereby limit or control the operating temperature of the engine 612. The temperature of the coolant will still be sufficient for cooling or other temperature control in the engine 612 even after cooling the electrical generating component 604 and/or the management clutch system 608 due to the high operating temperatures of the combustion chambers in the engine 612 (or of similar engines or the turbine 500 discussed above). As such, the engine 612 operates as a heat sink for the heat generating electrical components. Such configurations can be useful, for example, in systems such as hybrid vehicles, vehicles with fuel cells, vehicles with electrical generators, stationary engines with electrical generators, etc.

Figure 7:
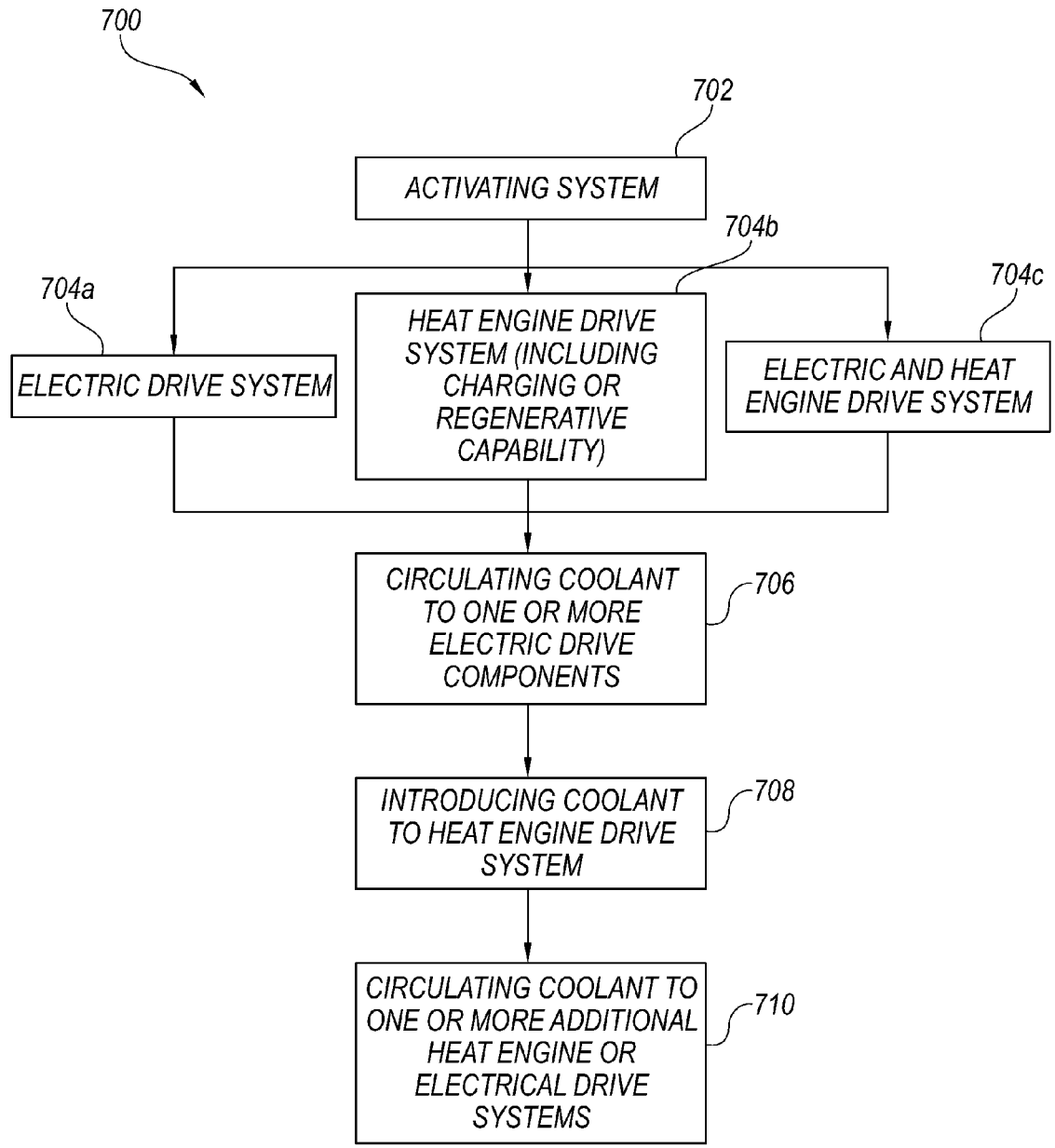
FIG. 7 is a flow diagram of a method for cooling one or more electrical generating components and for cooling a combustion chamber of an engine in accordance with embodiments of the disclosure.

FIG. 7 is a flow diagram of a method 700, such as a cascading method or coolant recycling method, for cooling one or more electrical generating components and for cooling a combustion chamber of an engine in accordance with embodiments of the disclosure. In the illustrated embodiment, the method 700 includes activating a system (block 702). The system can include any suitable electrical generating components described above with reference to FIG. 6. For example, and referring to FIG. 7, the system can include any electrical generating components that are typically included in at least one of an electric drive system (block 704a), a heat engine drive system (block 704b), and/or an electric and heat engine drive system (block 704c), as well as other suitable drive systems with electrical generating components. The method 700 further includes circulating a coolant or temperature controlling fluid to one or more electric drive components or electrical generating components (block 706). In certain embodiments, circulating the coolant to one or more electric drive components can include circulating the coolant to multiple electric drive components arranged in series or in parallel, thereby circulating the coolant in a cascading fashion between one or more electric drive components.

The method 700 further includes circulating or introducing the coolant into a heat engine drive system (block 708). The heat engine drive system can include, for example, any internal combustion engine with energy transferring components (e.g., two or four stroke piston engines, rotary combustion engines, gas turbine engines, and/or any combination of these or other suitable engines). Moreover, the coolant that is introduced into the heat engine drive system includes the same coolant that previously circulated through the one or more electric drive components upstream from the heat engine drive system. In certain embodiments, the method 700 can further include circulating the coolant (e.g., exhaust coolant) from the heat drive engine to one or more additional heat drive engines, electrical drive systems, and/or combinations of heat drive and electrical drive engines (block 710).

From the foregoing, it will be appreciated that specific embodiments of the disclosure have been described herein for purposes of illustration, but that various modifications may be made without deviating from the spirit and scope of the disclosure. For example, the methods and systems described herein for combustion chamber cooling are applicable to a variety of fuel cells and/or engines including internal combustion engines such as rotary combustion engines, two-stroke and four-stroke piston engines, free-piston engines, etc. Moreover, these methods and systems can provide for operation of such engines by insulation of combustion with surplus oxidant such as air to substantially achieve adiabatic combustion. In one embodiment, this can be achieved by first filling the combustion chamber with oxidant, and then adding fuel at the same location that ignition occurs to provide one or more stratified charges of fuel combustion within excess oxidant to minimize heat transfer to combustion chamber surfaces. Accordingly, the disclosure is not limited except as by the appended claims.

To the extent not previously incorporated herein by reference, the present application incorporates by reference in their entirety the subject matter of each of the following materials: U.S. Patent Application No. 61/237,476, filed on Aug. 27, 2009 and titled ELECTROLYZER AND ENERGY INDEPENDENCE TECHNOLOGIES; U.S. patent application Ser. No. 12/707,651, filed on Feb. 17, 2010 and titled ELECTROLYTIC CELL AND METHOD OF USE THEREOF; U.S. Patent Application No. 61/237,479, filed on Aug. 27, 2009 and titled FULL SPECTRUM ENERGY; U.S. Patent Application No. 61/178,442, filed on May 14, 2009 and titled ENERGY INDEPENDENCE TECHNOLOGIES; U.S. patent application Ser. No. 12/707,653, filed on Feb. 17, 2010 and titled APPARATUS AND METHOD FOR CONTROLLING NUCLEATION DURING ELECTROLYSIS; U.S. patent application Ser. No. 12/707,656, filed on Feb. 17, 2010 and titled APPARATUS AND METHOD FOR GAS CAPTURE DURING ELECTROLYSIS; U.S. patent application Ser. No. 09/969,860, filed on Oct. 1, 2001 and titled METHOD AND APPARATUS FOR SUSTAINABLE ENERGY AND MATERIALS; U.S. patent application Ser. No. 12/857,553, filed on Aug. 16, 2010 and titled SUSTAINABLE ECONOMIC DEVELOPMENT THROUGH INTEGRATED PRODUCTION OF RENEWABLE ENERGY, MATERIALS RESOURCES, AND NUTRIENT REGIMES, U.S. patent application Ser. No. 12/857,541, filed on Aug. 16, 2010 and titled SYSTEMS AND METHODS FOR SUSTAINABLE ECONOMIC DEVELOPMENT THROUGH INTEGRATED FULL SPECTRUM PRODUCTION OF RENEWABLE ENERGY; U.S. patent application Ser. No. 12/857,554, filed on Aug. 16, 2010 and titled SYSTEMS AND METHODS FOR SUSTAINABLE ECONOMIC DEVELOPMENT THROUGH INTEGRATED FULL SPECTRUM PRODUCTION OF RENEWABLE MATERIAL RESOURCES USING SOLAR THERMAL; U.S. patent application Ser. No. 12/857,502, filed on Aug. 16, 2010 and titled ENERGY SYSTEM FOR DWELLING SUPPORT; U.S. patent application Ser. No. 13/027,235, filed on Feb. 14, 2011 and titled DELIVERY SYSTEMS WITH IN-LINE SELECTIVE EXTRACTION DEVICES AND ASSOCIATED METHODS OF OPERATION; and U.S. Patent Application No. 61/401,699, filed on Aug. 16, 2010 and titled COMPREHENSIVE COST MODELING OF AUTOGENOUS SYSTEMS AND PROCESSES FOR THE PRODUCTION OF ENERGY, MATERIAL RESOURCES AND NUTRIENT REGIMES.

I claim:

1. A method of limiting a peak temperature of a combustion chamber in an engine, the method comprising:
    in a first portion of a cycle of the engine—
        injecting fuel directly into the combustion chamber during at least one of an intake stroke and a compression stroke of the first cycle; and
        igniting the fuel in the combustion chamber to cause combustion;
    monitoring a temperature of the combustion chamber resulting from the combustion; and in at least one of the first portion or a second portion of the cycle of the engine—
when the temperature reaches a predetermined value, injecting coolant directly into the combustion chamber only during at least one of a power stroke and an exhaust stroke of the cycle;
wherein injecting fuel directly into the combustion chamber comprises injecting a first fuel that combusts at a first temperature of combustion in the combustion chamber; and
wherein injecting the coolant directly into the combustion chamber comprises injecting a second fuel that combusts at a second temperature of combustion in the combustion chamber, wherein the second temperature is less than the first temperature.

2. The method of claim 1 wherein injecting coolant directly into the combustion chamber comprises injecting a hydrogenous coolant directly into the combustion chamber.

3. The method of claim 1 wherein injecting coolant directly into the combustion chamber comprises injecting coolant during each of the power stroke and the exhaust stroke of the cycle.

4. The method of claim 1 wherein the predetermined value of the temperature is 2200 degrees C.

5. The method of claim 1 wherein:
injecting fuel directly into the combustion chamber comprising injecting fuel with an injector; and
igniting the fuel in the combustion chamber comprises igniting the fuel with an ignition feature carried by the injector.

6. The method of claim 1, further comprising:
determining a predefined operational mode of the engine, the predefined operational mode comprising an acceleration or high load operational condition of the engine; and
when the engine operates in the predefined operational mode, injecting coolant directly into the combustion chamber only during at least one of the power stroke and an exhaust stroke of the cycle.

7. A method of cooling a combustion chamber in an engine, the method comprising:
introducing fuel into the combustion chamber of the engine, wherein an energy transfer device moves at least partially within the combustion chamber through an intake stroke, a compression stroke, a power stroke, and an exhaust stroke;
causing the fuel to combust in the combustion chamber;
monitoring a temperature of the combustion chamber; and
when the temperature reaches a predetermined value, introducing coolant into the combustion chamber only during at least one of the power stroke and the exhaust stroke of the energy transfer device, wherein introducing coolant into the combustion chamber comprises introducing a coolant that combusts in the combustion chamber at a lower temperature than the fuel.

8. The method of claim 7 wherein:
introducing the fuel into the combustion chamber comprising introducing the fuel with an injector; and
causing the fuel to combust comprises generating an ignition event with an ignition feature carried by the injector.

9. The method of claim 7 wherein:
introducing the fuel into the combustion chamber comprising introducing the fuel with an injector; and
introducing coolant into the combustion chamber comprises introducing the coolant with the injector.

10. The method of claim 9, further comprising:
monitoring the engine for a predefined operational condition of the engine; and
when the engine operates in the predefined operational condition, introducing coolant into the combustion chamber only during at least one of the power stroke and the exhaust stroke.

11. An internal combustion engine system comprising:
a combustion chamber;
an energy transfer device movable relative to the combustion chamber through a cycle comprising an intake stroke, a compression stroke, a power stroke, and an exhaust stroke;
an injector configured to inject fuel into the combustion chamber during at least one of the intake stroke and the compression stroke;
an ignition feature configured to ignite the fuel in the combustion chamber; and
a sensor configured to detect a temperature of the combustion chamber, wherein when the temperature reaches a predetermined value, the injector is configured to inject coolant directly into the combustion chamber only during at least one of the power stroke and the exhaust stroke;
wherein the fuel that combusts at a first temperature of combustion in the combustion chamber and wherein the coolant comprises a second fuel that combusts at a second temperature of combustion in the combustion chamber less than the first temperature.

12. The system of claim 11 wherein the ignition feature is carried by the injector.

13. The system of claim 11 wherein the coolant at least partially contains hydrogen.

14. The system of claim 11 wherein the predetermined value of the temperature is 2200 degrees C.

* * * * *